(12) United States Patent
Zeh et al.

(10) Patent No.: US 11,374,758 B2
(45) Date of Patent: Jun. 28, 2022

(54) TRANSCEIVER AND TRANSCEIVER SYSTEMS

(71) Applicant: Infineon Technologies AG, Neubiberg (DE)

(72) Inventors: Alexander Zeh, Munich (DE); Vivin Richards Allimuthu Elavarasu, Munich (DE); Eric Pihet, Munich (DE)

(73) Assignee: Infineon Technologies AG, Neubiberg (DE)

( * ) Notice: Subject to any disclaimer, the term of this patent is extended or adjusted under 35 U.S.C. 154(b) by 169 days.

(21) Appl. No.: 16/395,783

(22) Filed: Apr. 26, 2019

(65) Prior Publication Data

US 2019/0334720 A1 Oct. 31, 2019

(30) Foreign Application Priority Data

Apr. 27, 2018 (DE) .......................... 102018110252.6

(51) Int. Cl.
*H04W 12/10* (2021.01)
*H04L 9/32* (2006.01)
*H04W 12/02* (2009.01)

(52) U.S. Cl.
CPC ........... *H04L 9/3226* (2013.01); *H04W 12/02* (2013.01); *H04W 12/10* (2013.01); *H04L 2209/80* (2013.01)

(58) Field of Classification Search
CPC ............................. H04W 12/02; H04W 12/10
See application file for complete search history.

(56) References Cited

U.S. PATENT DOCUMENTS

| 9,419,737 | B2* | 8/2016 | Fredriksson | .......... H04J 3/0658 |
| 2007/0121939 | A1 | 5/2007 | Olesen et al. | |
| 2013/0103959 | A1 | 4/2013 | Hatta | |
| 2013/0163761 | A1 | 6/2013 | Baras et al. | |
| 2015/0282271 | A1* | 10/2015 | Takarada | ............... H05B 45/37 315/192 |
| 2016/0024148 | A1 | 1/2016 | Hermans et al. | |
| 2016/0065362 | A1* | 3/2016 | Choyi | ................... H04W 12/04 380/279 |
| 2016/0342531 | A1 | 11/2016 | Sharma | |
| 2017/0153996 | A1* | 6/2017 | Ross | .............. H03K 19/018521 |
| 2019/0116045 | A1* | 4/2019 | Markham | ............. H04L 1/0061 |

FOREIGN PATENT DOCUMENTS

| JP | H03-230637 A | 10/1991 |
| JP | 2001-043141 A | 2/2001 |
| JP | 2001-235517 A | 8/2001 |
| JP | 2008-193606 A | 8/2008 |
| JP | 2012-038040 A | 2/2012 |
| JP | 2014-075414 A | 4/2014 |
| WO | 2015-183784 A1 | 12/2015 |

* cited by examiner

*Primary Examiner* — Peter D Nolan
*Assistant Examiner* — Roy Rhee
(74) *Attorney, Agent, or Firm* — Banner & Witcoff Ltd.

(57) ABSTRACT

A transceiver is disclosed including a transmitter designed to output a first signal according to a physical communication protocol, and to output a second signal comprising at least one cryptographic datum. The first and the second signal may be overlaid onto one another as an overlay signal at the output of the transceiver, and may comply with the physical communication protocol. The overlay signal may be received and processed by a receiver.

24 Claims, 21 Drawing Sheets

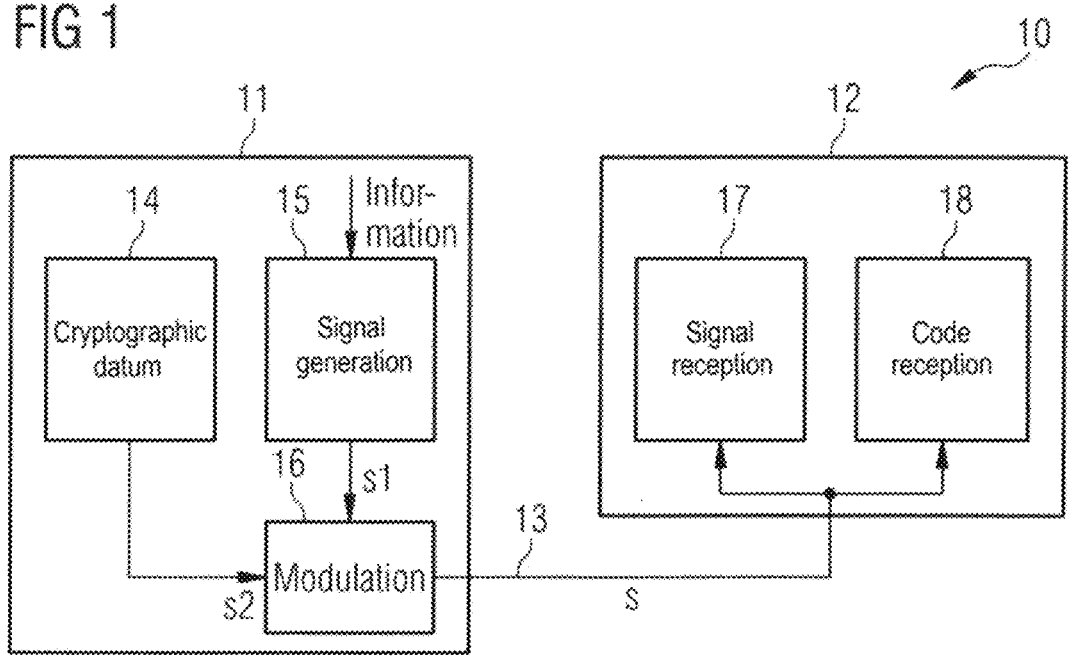
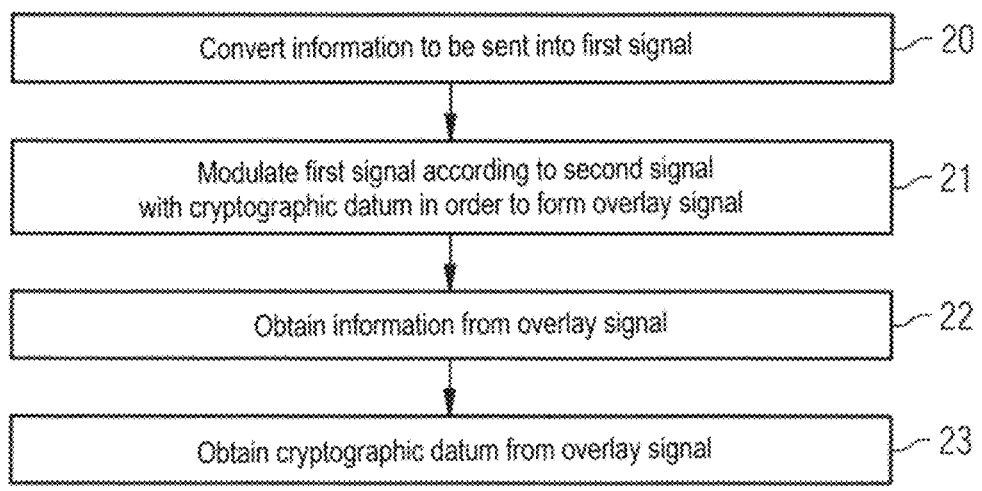

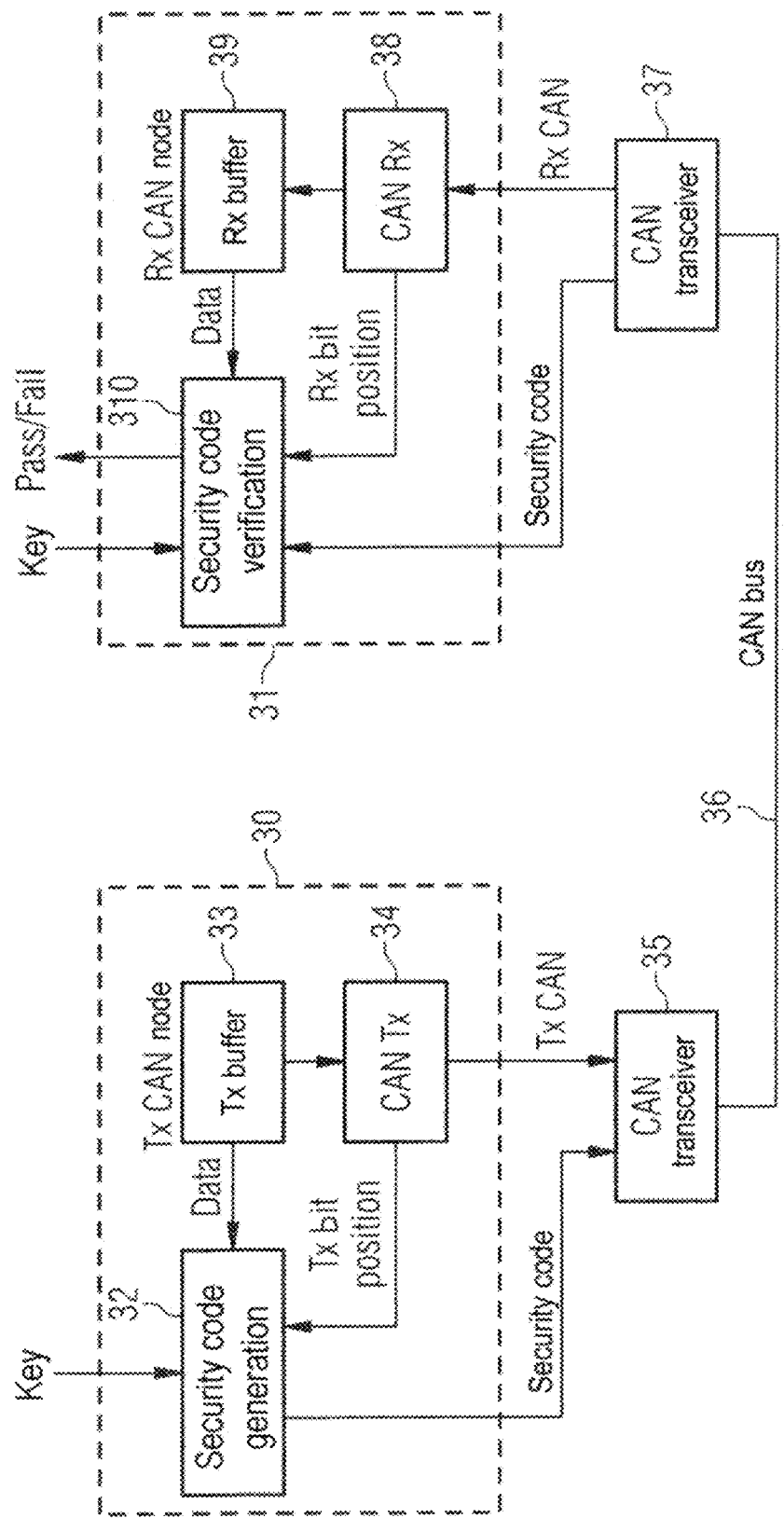

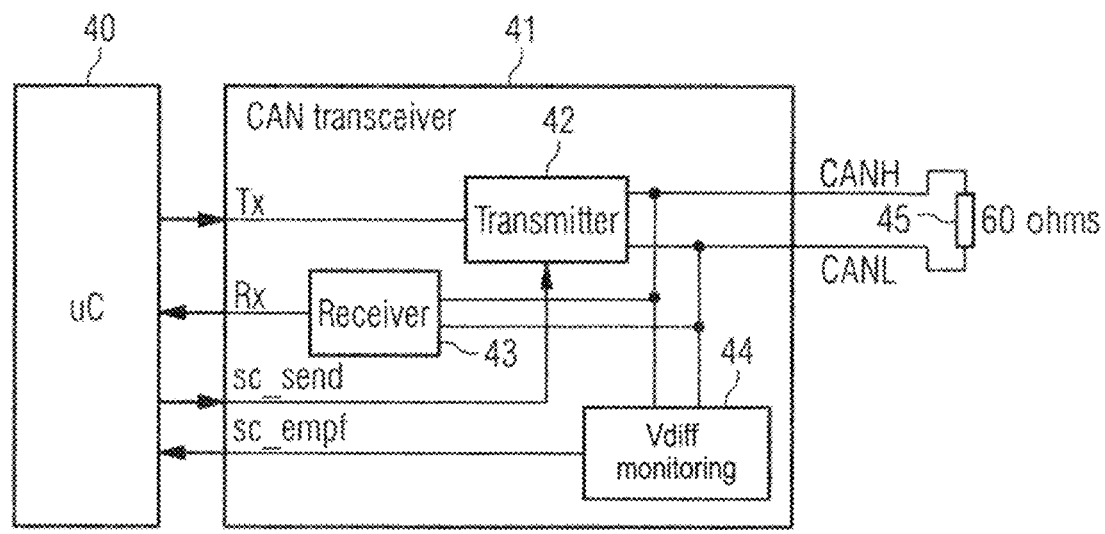
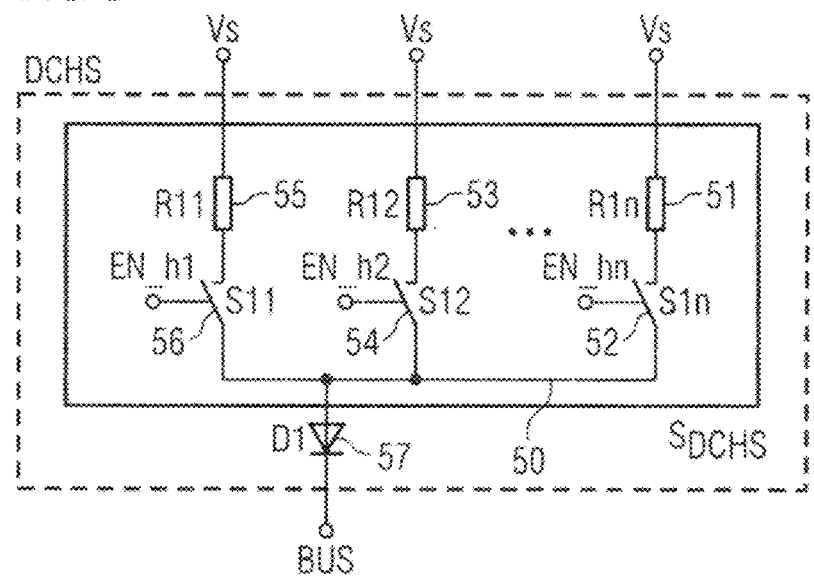

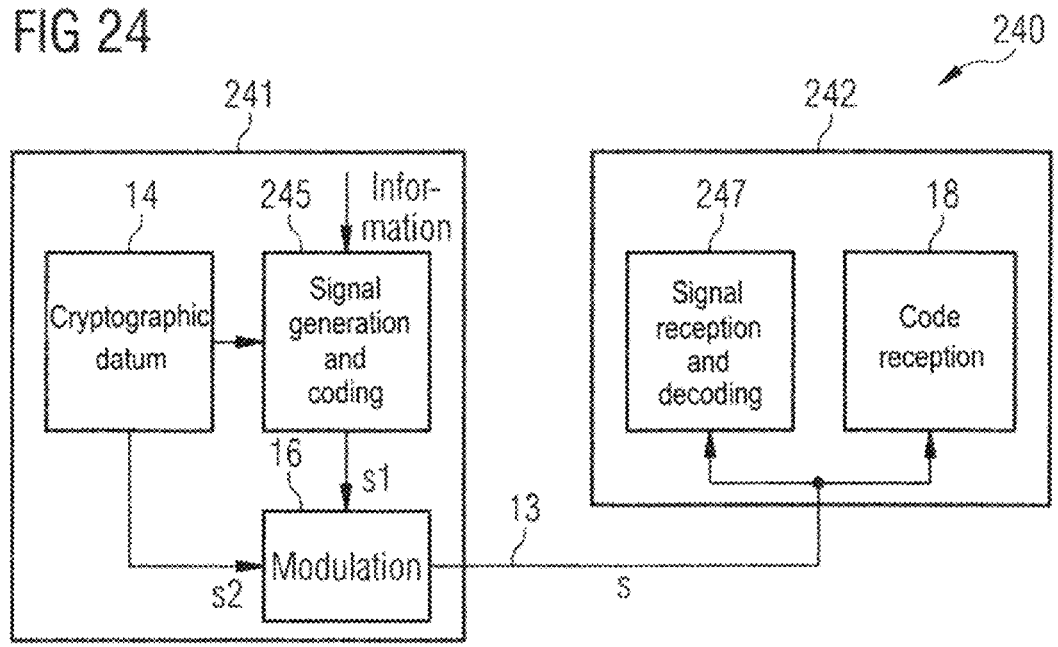
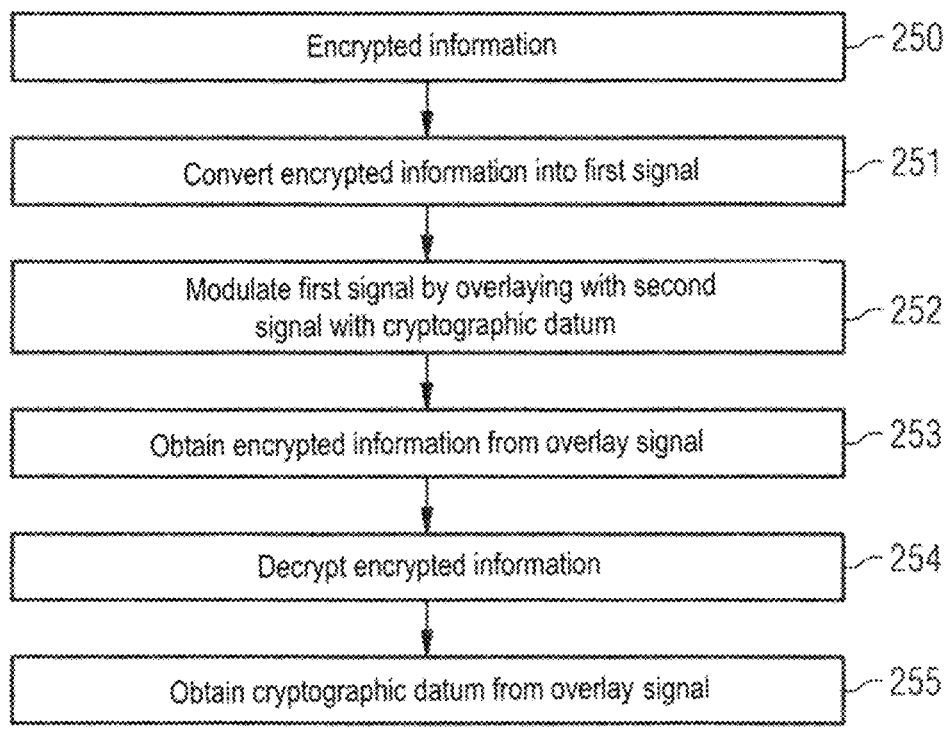

TRANSCEIVER AND TRANSCEIVER SYSTEMS

TECHNICAL FIELD

The present application relates to transceivers, systems implementing such transceivers, and corresponding methods.

BACKGROUND

Many apparatuses contain a multiplicity of components that communicate with one another in order to interchange data. An example of such apparatuses are vehicles, in which a multiplicity of control units such as microcontrollers communicate with one another in order to control various vehicle functions. Also, sensors in vehicles capture physical variables and communicate with the aforementioned control units in order to communicate the measured variables. Examples of such control units in vehicles include engine controllers, gearbox controllers, control units for theft prevention and the like. Examples of sensors include cameras, speed sensors, radar sensors, temperature sensors and the like.

The communication by the various components among one another can be effected wirelessly or by wire in this case, with wired communication being employed in many applications. In vehicles, the CAN (controller area network) bus is frequently employed, which is standardized according to ISO 11898. Other bus systems, for example the FlexRay bus (ISO 17458-1 to ISO 17458-4) or LIN bus (ISO 17987-1 in future), can also be employed.

One possibility that can arise with such apparatuses is that a communication device wishes to participate in the communication between the components without permission. By way of example, an external communication device can be connected to a CAN bus of a vehicle in order to perform manipulations on the vehicle, for example in order to adjust a mileage on a speedometer or to override theft prevention measures of the vehicle. It is thus desirable to be able to detect such communication devices attempting unauthorized intervention.

SUMMARY

Aspects related to transceivers and the accompanying architecture of systems implementing transceivers are provided.

According to one exemplary embodiment, a transceiver is provided, comprising:
a transmitter configured to output a first signal according to a physical communication protocol, and to output a second signal including at least one cryptographic datum,
wherein the first signal and the second signal are overlaid onto one another as an overlay signal at an output of the transmitter, and
wherein the overlay signal complies with the physical communication protocol.

According to another exemplary embodiment, a transceiver is provided, comprising:
a receiver configured to:
receive a receive signal, which is an overlay of (i) a first signal according to a physical communication protocol, and (ii) a second signal comprising a cryptographic datum,
process the received signal according to the physical communication protocol to obtain information transmitted in the first signal, and
obtain the cryptographic datum from the received signal.

According to a further exemplary embodiment, a transceiver is provided, comprising:
output a first signal according to a physical communication protocol, and
output a second signal including at least one cryptographic datum,
wherein the first signal and the second signal are overlaid onto one another as an overlay signal at an output of the transmitter, and
wherein the overlay signal complies with the physical communication protocol; and
a receiver configured to:
receive the overlay signal;
process the overlay signal according to the physical communication protocol to obtain information transmitted in the first signal; and
obtain the cryptographic datum from the overlay signal, wherein the transmitter and the receiver are coupled to one another via a communication medium.

BRIEF DESCRIPTION OF THE DRAWINGS

FIG. 1 is a block diagram of a system according to some exemplary embodiments.

FIG. 2 is a flowchart for a method according to some exemplary embodiments.

FIG. 3 shows a system according to some exemplary embodiments.

FIG. 4 shows a communication circuit having a transceiver according to some exemplary embodiments.

FIG. 5 shows a driver circuit for producing different signal levels that is able to be used in some exemplary embodiments.

FIG. 24 shows a system according to some exemplary embodiments.

FIG. 25 shows a flowchart to illustrate a method according to some exemplary embodiments.

DETAILED DESCRIPTION

Various exemplary embodiments are described in detail below. It should be noted that these exemplary embodiments are used merely for illustration and are not intended to be interpreted as limiting. As such, a description of an exemplary embodiment having a multiplicity of features (e.g. components, properties, processes, etc.) is not intended to be interpreted to mean that all of these features are necessary for implementing the respective exemplary embodiment. Rather, some features can be replaced by alternate features or omitted. In addition to the explicitly depicted features, additional features, for example features used in conventional communication circuits, can also be provided.

Features of different exemplary embodiments can be combined with one another, unless indicated otherwise. Variations and modifications described for one of the exemplary embodiments are also applicable to other exemplary embodiments and are thus not described repeatedly.

Various exemplary embodiments of communication circuits and arrangements of such communication circuits are explained in detail below. Even if the communication circuits are described with reference to particular communication media, in particular bus systems such as a CAN bus, at times, the depicted techniques are also applicable to other communication media, for example wired communication media, wireless communication media or optical communication media such as optical fibers. The use of specific examples is thus used merely for illustration in this case.

Figure 37:
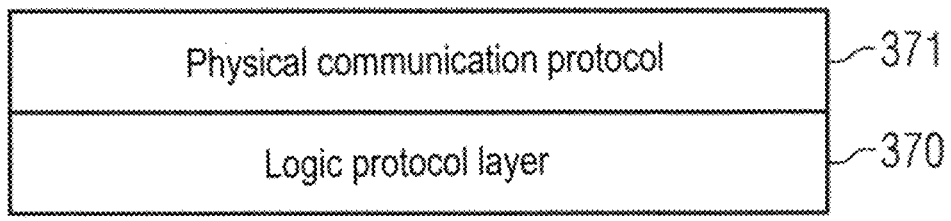
FIG. 37 shows a physical communication protocol and a logic protocol layer according to some exemplary embodiments.

The description makes reference to a physical communication protocol of the communication and a logic protocol layer of the communication at times. The physical communication protocol defines functions according to the physical layer of the OSI layer model and defines how data to be sent, e.g. a bit stream, are converted into physical signals on a transmission medium. The logic protocol layer is superordinate to the physical communication protocol and, by contrast, relates to, for example, higher layers of the OSI model or else layers above the OSI model (applications) and can in particular relate to which data are transmitted, including a coding or encryption of the data. This is illustrated in FIG. 37 with a physical communication protocol 370 and a superordinate logic protocol layer 371.

FIG. 1 is a schematic depiction of a system 10 according to some exemplary embodiments having a first communication circuit 11, which is used as a transmitter in the depicted example, and a second communication circuit 12, which is used as a receiver in the depicted example. The system 10 can be part of an apparatus such as a vehicle, and the communication circuits 11, 12 can be arranged in components of this apparatus in order to allow the components to communicate with one another.

The communication circuit 11 uses a communication medium 13 to send signals to the communication circuit 12. The communication medium 13 can be a wireless communication medium, a wired communication medium or else an optical communication medium. In the case of a wired communication medium, it can be in particular a bus system such as a CAN bus, a FlexRay bus or a LIN bus, but is not restricted thereto.

While FIG. 1 depicts the communication circuit 11 as a transmitter and the communication circuit 12 as a receiver, the communication circuit 11 can also additionally contain circuit parts for receiving signals and/or the communication circuit 12 can additionally contain circuit parts for sending signals, in order to allow bidirectional communication, which means that the communication circuits 11, 12 are both in the form of a transceiver.

The communication via the communication medium 13 is effected in this case according to a physical communication protocol. Physical communication protocols of this kind are defined for different types of communication and, as explained above, define in particular how information to be sent (useful data, control data and the like) is to be converted into physical signals (on a communication medium or wirelessly). By way of example, for the CAN bus and similar bus systems, voltage levels are established that define two different states corresponding to a logic 1 and a logic 0, and signals are sent as a succession of such voltage levels. However, other types of signals are also possible, e.g. frequency modulated signals, AC signals, quadrature amplitude modulated (QAM) signals, and the like.

To this end, a signal generation circuit 15 receives information to be sent, e.g. useful data or control data to be sent, and generates a first signal s1 according to the physical communication protocol. The information to be sent can be obtained as a logic signal from a logic protocol layer, and arranged over the physical communication protocol, according to a logic protocol. This first signal s1 can have e.g. two or more different voltage or current levels, as explained, in order to convert the information into the signal. This signal generation can be effected in any conventional manner for the respective physical communication protocol.

Also, a modulation circuit 16 is used to overlay the first signal s1 with a second signal s2 comprising a cryptographic datum 14. A cryptographic datum may be, for example, a code or other datum allowing authentication of a signal sent via the communication medium 13 as coming from an authorized communication subscriber (i.e. communication subscribers permitted to communicate with one another). By way of example, the cryptographic datum can be a prescribed bit sequence that is known only to authorized communication subscribers or is determinable thereby. An unauthorized communication subscriber, e.g. a communication apparatus coupled to the communication medium 13 without permission, as explained at the outset, does not know the cryptographic datum, on the other hand, e.g. because it is not provided with an appropriate key. The cryptographic datum can be generated by means of conventional cryptographic methods, e.g. on the basis of a cryptographic key that the transmitter 11 can obtain from a superordinate authority, as will be explained later. The term "cryptographic" is thus intended to be understood here not in the narrower sense as encryption, but rather in the broader sense as denoting an element that contributes to making the system 10 resistant to manipulation. The cryptographic datum can in this case depict in particular a security code of the transmitter 11 that identifies the transmitter 11 as the source of a sent signal and therefore allows authentication.

The modulation circuit 16 results in the second signal s2 with the cryptographic datum being modulated on the physical level onto the first signal s1 generated by the signal generation circuit 15, e.g. by modifying signal levels of the first signal s1, so as to form an overlay signal s. This differs from approaches in which information to be sent is encrypted, this corresponding to encryption on a logic protocol layer. As will be explained later, such encryption or other coding on a logic protocol layer can be performed in addition, however.

In some exemplary embodiments, the communication protocol defines tolerances for levels to be used. By way of example, the communication protocol can specify that a level corresponding to a logic 1 must be within a first voltage range and/or that a level corresponding to a logic 0 must be within a second voltage range in order to be validly detected as either a 1 or 0. In exemplary embodiments, the modulation circuit then modulates the first signal, by overlaying it with the second, so that the levels of the signal remain within the specified ranges. In the case of other types of communication protocols too, amplitudes of the second signal s2 can be so small that the overlay signal s complies with the physical communication protocol, i.e. that the overlay signal s may be subsequently processed according to the physical communication protocol in order to recover the information of the first signal s1. This can ensure backward compatibility in some exemplary embodiments, i.e. even receivers that are not equipped as discussed for the receive circuit 12 later can receive the signal correctly. Examples of such overlays of signals will be explained in more detail later.

It should also be borne in mind that although the signal generation circuit 15 and the modulation circuit 16 are depicted as blocks connected in series for illustration, the modulation and the signal generation can also take place at the same time, as explained later. The depicted arrangement is therefore used to illustrate the different functions.

The overlay signal s thus modulated is then sent to the communication circuit 12 via the communication medium 13. The communication circuit 12 comprises a signal receive circuit 17 that recovers the information converted into the first signal s1 by the signal generation circuit 15. Also, the communication circuit 12 has a code receive circuit 18 that recovers the cryptographic datum contained in the second signal s2 modulated by the modulation circuit 16. If the cryptographic datum recovered in this manner is not concordant with an expected cryptographic datum (e.g. a cryptographic datum stored in the communication circuit 12 or a cryptographic datum obtained from a provided key), measures can be taken. By way of example, the received signal and the information obtained therefrom can be rejected, and an appropriate signal can be generated in order to inform other components of the unauthenticated signal, and/or a user can be informed. In this manner, unauthorized access attempts can be detected in some exemplary embodiments, and countermeasures can be taken.

The signal receive circuit 17 can be configured for the respective physical communication protocol in the conventional manner in this case. Examples of the code receive circuit 18 and in particular calibration options for the code receive circuit 18 are explained in more detail later. It should be noted that the communication circuit 12 can also process received signals that contain only the first signal or in which the second signal is not processable, e.g. on account of interference. In this case, e.g. only the signal section circuit 17 is processed.

FIG. 2 shows a flowchart to illustrate methods according to some exemplary embodiments. To avoid repetition, the method of FIG. 2 is explained with reference to FIG. 1. The method of FIG. 2 is also usable independently of the apparatus of FIG. 1, however.

At 20, information to be sent is converted into a first signal. As already explained for the signal generation circuit 15, this can be effected on the basis of a physical communication protocol, which means that a signal is generated that has levels that can represent a logic 1 and a logic 0, or may use an alternate way of transmitting the information to be sent.

At 21, the transmit signal is modulated according to a second signal comprising a cryptographic datum, as described for the modulation circuit 16 in FIG. 1, for example. The cryptographic datum can be generated on the basis of a key. As such, an overlay signal is generated that complies with the physical communication protocol, as described above. As described for the signal generation circuit 15 and the modulation circuit 16 of FIG. 1, the conversion at 20 and the modulation at 21 also do not have to take place in succession, but rather can, e.g. be performed at the same time.

At the receiver end, the information is then recovered from the overlay signal at 22, as described for the signal receive circuit 17, and at 23 the cryptographic datum is recovered from the overlay signal, as described for the code receive circuit 18 of FIG. 1, for example. The obtainment of the information at 22 and the obtainment of the cryptographic datum at 23 also do not have to be effected in succession as depicted in FIG. 2, but rather can also take place at the same time or in a different order. If the cryptographic datum obtained at 23 does not correspond to an expected cryptographic datum, appropriate measures can be taken, as already explained with reference to FIG. 1.

FIG. 3 shows a communication circuit arrangement according to some exemplary embodiments, the communication medium used being a CAN bus 36 in this case. In the exemplary embodiment of FIG. 3, a communication circuit 30, 35 is used as transmitter, and a communication circuit 31, 37 is used as receiver. The reference sign 30 in this case denotes a transmit node that supplies a transceiver 35 with data to be sent and a security code. The transceiver 35 can also be used for receiving data, this not being depicted explicitly in FIG. 3. The transmit node 30 can be implemented by means of a microcontroller.

Data to be sent may be written to a transmit buffer 33 of the transmit node 30 in the conventional manner. These data to be sent are converted by a transmit circuit 34 into a bit sequence to be sent, i.e. a sequence of logic ones and zeros, which is then sent to the transceiver 35 as signal Tx.

A security code generator 32 receives a key and takes this key as a basis for generating a security code as a cryptographic datum. The key can in this case be received from a key management device that is specially protected, in particular from a hardware security module (HSM), as will be explained in more detail later.

The security code generator 32 in addition receives information about the data to be sent and a position of what are known as dominant transmit bits, and generates the security code, in the depicted example of the CAN protocol, such that the security code is modulated only onto dominant bits of a data portion of the transmission. In the case of other physical communication protocols too, particular levels can be selected onto which the second signal with the cryptographic datum is modulated.

Dominant bits are in this case bits that result in a bus such as the CAN bus 36 being actively driven to one level, whereas what are known as recessive bits result in it being passively pulled to another level by resistors. For the CAN transmission, bits representing a logic 0 are dominant bits and bits representing a logic 1 are recessive bits. In other communication standards, this may be different, and, for example, all bits can be actively driven. As used herein, the phrase "only onto," "only for," etc., with regards to data portions may refer to the transmission in the case of CAN and other communication protocols being effected in what are known as data frames (frames) that have what is known as a header followed by the data portion for useful data. In some exemplary embodiments, the security code is modulated only onto this data portion. This can be advantageous in the case of the CAN protocol, since multiple transmitters can send on the CAN bus at the same time during the header. In other exemplary embodiments, in particular other physical communication protocols, header bits can also be used for modulation with the security code.

The transceiver 35 then modulates the amplitudes of the dominant bits according to the security code, this corresponding to the overlay of the second signal in this exemplary embodiment. Knowledge of the data and of the bit positions allows the security code generator to generate the security code accordingly such that bit changes in the security code (from 0 to 1 or from 1 to 0) occur only for dominant bits. An example of this is explained later. In this case, the second signal is thus a pulsed signal having two states corresponding to 0 and 1. In other exemplary embodiments, other types of second signals, e.g. AC signals such as QAM modulated signals, can also be used, so long as a cryptographic datum is transmittable.

At the receiver end, a CAN transceiver 37 decodes the security code from the sent signal and also provides a receive circuit 38 of a receive node 31 with a received signal based on the received levels according to the CAN communication protocol. The receive circuit 38 obtains receive data from the signal Rx, which are stored in a receive buffer 39.

The recovered security code, the position of received bits and the received data are provided to a verification circuit 310. The verification circuit 310 receives the key on the basis of which the security code generator 32 generated the security code. Based on the key, the receive data and the receive bit position, the verification circuit 310 can determine an expected security code using the same rules that the security code generator 32 used to determine the security code from the key, the transmit data and the transmission bit position. Examples in this regard will be explained. This expected security code is then compared with the received security code. If there is concordance, the authentication is successful and the received data can be used. If there is concordance, the authentication has failed, and measures can be taken as already explained with reference to FIG. 1.

An example of the design of CAN transceivers according to exemplary embodiments, for example the CAN transceivers 35, 37 of FIG. 3, is now explained with reference to FIGS. 4 and 5.

FIG. 4 shows a CAN transceiver 41 according to an exemplary embodiment, communicating with a microcontroller 40. The microcontroller 40 can in this case perform in particular the functions explained for the transmit node 30 of FIG. 3 and/or the receive node 31 of FIG. 3, in particular can provide a second signal and a cryptographic datum, such as a security code, and a first signal to be sent.

In FIG. 4, transmit data to be sent as a first signal are denoted by Tx, receive data recovered from a receive signal are denoted by Rx, the security code to be sent as a second signal is denoted by sc_send and the received security code is denoted by sc_empf.

The first transmit data Tx to be sent, which determine the first signal, and the security code to be sent as a second signal are transmitted to a transmitter 42 of the transceiver 41. The latter generates on CAN lines CANH, CANL an appropriate overlay signal according to the CAN communication protocol, which signal is modulated by the security code. The lines CANH, CANL are connected to a resistor 45 of approximately 60 ohms in this case as specified by the aforementioned CAN standards. Recessive bits result in the potentials of the lines CANH, CANL being aligned with one another by the resistor 45, so that there is substantially no potential difference between the lines. Dominant bits result in the lines CANH, CANL being actively driven to a voltage difference by the transmitter 42.

Examples of the implementation of the transmitter 42 in this regard will be explained in more detail later. To receive, the lines CANH, CANL are connected to a receiver 43 that recovers the first signal s1. Also, the lines are connected to a monitoring circuit 44 recovering the security code from the difference voltage between the voltages on the lines CANH, CANL. To this end, the difference voltage can be compared in particular with a threshold value, as will be explained in more detail later.

FIG. 5 shows part of a transmitter, in particular a driver as an example of a possible implementation of the transmitter 42 of FIG. 5. Generally, in the dominant phase, the line CANH is connected to a positive voltage (for example VDD, VCC or another supply voltage Vs) via a resistor, and the line CANL is connected to a smaller voltage in regard thereto (for example VSS, ground or the like) via a resistor. This connecting can take place in steps via multiple resistors.

FIG. 5 shows an appropriate circuit for the line CANH. An appropriate circuit can also be provided for the line CANL.

The driver of FIG. 5 comprises a parallel connection 50 of a multiplicity of resistors 55, 53, 51, each of which is connected in series with an associated switch 56, 54, 52. The switches can be implemented by means of transistors, for example. A first connection of the resistors 55, 53, 51 is connected to a supply voltage Vs, and a respective second connection is connected to a first connection of the respective associated switch. Second connections of the switches 56, 54, 52 are connected to the line CANH via a diode 57. The number of three resistors and three associated switches is intended to be understood as an example in this case, and any number of resistors having respective associated switches can be provided.

A recessive bit results in all the switches 56, 54, 52 being open, and the resistor 45 of FIG. 4 is used to equalize a voltage difference between CANH and CANL. A dominant bit results in the switches 56, 54, 52 being progressively closed, so that the voltage level on the line CANH is ultimately determined by the supply voltage Vs, the value of the resistors 55, 53, 51, the value of the resistor 45 and the value of corresponding resistors of a corresponding circuit connected to the line CANL.

In the transmit circuit 42 of FIG. 4, the security code determines how many switches are closed for a dominant bit, e.g. for a change in Tx in FIG. 4 from 1 to 0. By way of example, some of the switches 56, 54, 52, e.g. all the switches apart from the switch 52, are always closed in the dominant case. Others of the switches, for example the switch 52, are controlled on the basis of the security code in the dominant case. In this manner, e.g. closing the switches 56, 54 produces the level for a dominant bit of the CAN transmission, and selectively closing the switch 52 modulates the security code. In this example the resistor 51 is then dimensioned such that opening and closing the switch 52 does not cause the voltage level on the line CANH to leave a voltage range specified for the dominant level by the communication protocol, in this case the CAN protocol.

Said specified voltage range can ensure backward compatibility in some exemplary embodiments. In other exemplary embodiments, it is also possible for more than one switch to be used for modulating the security code onto the signal.

Figure 6:
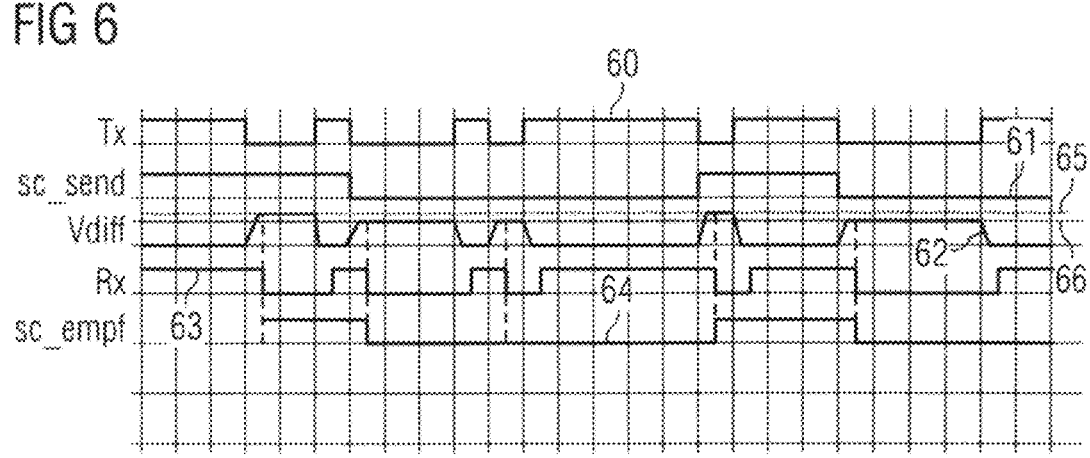
FIGS. 6-9 show examples of signals according to some exemplary embodiments.

As a further illustration, FIG. 6 shows examples of signals of the exemplary embodiment of FIG. 4. It should be noted that these and also other signal forms depicted in this application are used for illustration and the exact signal forms can change on the basis of the implementation, information to be transmitted and a chosen security code or other cryptographic data, communication protocols used and on the basis of external circumstances such as temperature.

60 denotes the transmit data Tx in FIG. 4, i.e. the data to be sent that determine the first signal, which are received in the transceiver 41 from the microcontroller 40. The data are a succession of logic ones and zeros.

61 denotes the security code to be sent, which determines the second signal. 62 represents an overlay signal ultimately sent to the CAN bus, with the difference between the voltages on the lines CANH, CANL, also referred to as Vdiff, also being represented. A logic 1 for the transmit data 60 results in there being a recessive state for the bus, i.e. the lines CANH, CANL are not actively driven, and the resistor 45 is used to align the potentials of the lines CANH, CANL into with one another. The overlay signal 62, which reflects the difference voltage Vdiff, is thus at or close to 0. A logic 0 (low level) of the signal 60 results in the lines CANH, CANL each being connected to voltages via resistors, as explained with reference to FIG. 5, resulting in a difference voltage.

During these dominant phases, the security code 61 is modulated as a second signal. As can be seen from the overlay signal 62, during the dominant phases the voltage Vdiff is somewhat higher, at a level 65, when the signal 61 is at logic 1 (high level), and somewhat lower, at a level 66, when the security code 61 is at logic 0 (low level). This can be achieved, as explained with reference to FIG. 5, by selectively closing the switch, such as the switch 52.

63 denotes the receive data Rx recovered from the signal 62. Said signal corresponds to the signal 60 with a delay that is dependent on a choice of the sampling times. 64 denotes the recovered security code. Said security code corresponds to the sent security code 61 likewise with a delay. So that this is possible, signal changes, as already explained briefly above, in the security code 61 are chosen such that they are during dominant phases, for example, as shown in FIG. 6, are coincident with the beginning of dominant phases, for which purpose, as already explained with reference to FIG. 3, a security code generator obtains information about the data to be sent. An edge change in the signal 61 during a recessive phase would, by contrast, not be immediately reflected in the signal 62, but rather if need be only on the next dominant bit, which would lead to a change in the signal 64 in comparison with the signal 61.

It should be borne in mind that, depending on the data to be sent, relatively many recessive bits can be sent progressively. Depending on the physical communication protocol used, however, a certain number of dominant phases is ensured, which means that the security code or, generally, a second signal comprising a cryptographic datum can be modulated.

Figure 7:
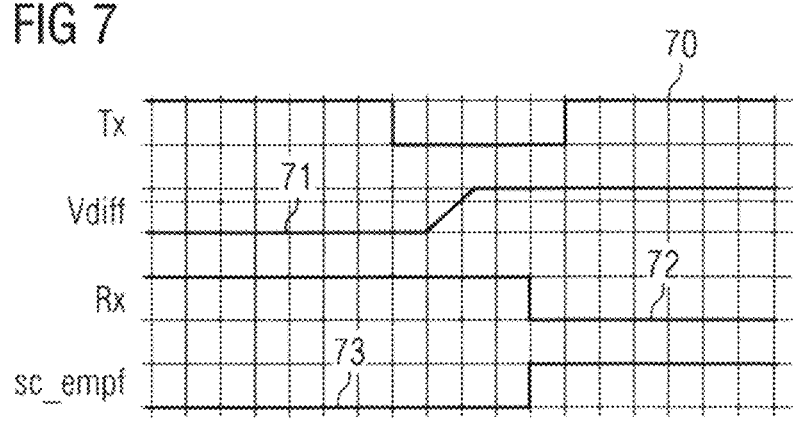
Figure 8:
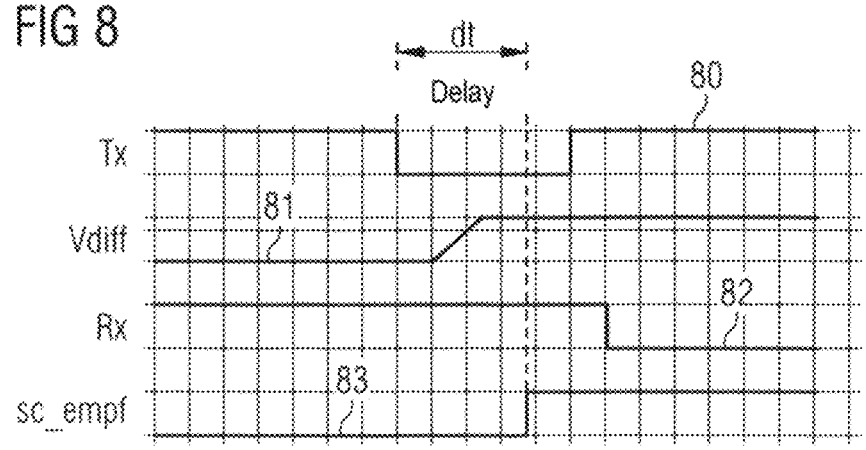

As explained above, the choice of sampling times (and if need be also other effects such as signal propagation times) produces a delay between the transmit data Tx that are to be sent and the recovered receive data Rx. This will be explained in more detail with reference to FIGS. 7 and 8. FIGS. 7 and 8 relate in this case in particular to the recovery of the security code and the choice of sampling times therefor, i.e. the choice of times at which the voltage difference Vdiff is evaluated to obtain the security code.

FIG. 7 shows the transmit data Tx as a characteristic 70, the voltage Vdiff as an overlay signal 71, the receive data Rx as a characteristic 72 and the recovered security code as a characteristic 73. In this example, the voltage Vdiff is evaluated for the security code on the falling edge of the signal Rx. In other words, as soon as a falling edge of the signal Rx and hence a transition to a dominant phase is detected, the voltage difference Vdiff is evaluated in order to recover a value for the security code. This can be accomplished by comparing the voltage difference Vdiff with a threshold value that lies between the two possible signal levels in the dominant case (cf. the two levels 65, 66 shown in FIG. 6, the threshold value chosen then being a voltage between these levels), as will be explained later. In this case, the recovered security code 73 is in sync with the receive data 72 in terms of edge changes. This requires the overlay signal 71 to be "valid", i.e. to have reached its steady-state value, at this time for the sampling for recovering security code. This is the case, for example, if the loop delay is shorter than the period of a bit at the highest bit rate (for example this corresponds to 200 nanoseconds at 5 megabits per second), since otherwise the bit state could already have changed again.

An alternative is shown in FIG. 8. FIG. 8 shows transmit data Tx, an overlay signal 81 as voltage difference Vdiff on the bus, receive data Rx and a recovered security code 83. In this case, the difference voltage Vdiff is sampled at a prescribed time dt after the falling edge of transmit data 80, the time dt being chosen to be shorter than the period of one bit at the highest occurring bit rate. This ensures that the bit has not changed again at the sampling time. In this case, the recovered security code 83 is not in sync with the receive data 82 in terms of edge changes.

These sampling times are provided as an example and not by way of limitation. Generally, sampling times can be chosen at which the signal has assumed the signal levels to be sampled insofar as the different levels of the modulated security code are distinguishable.

Figure 9:
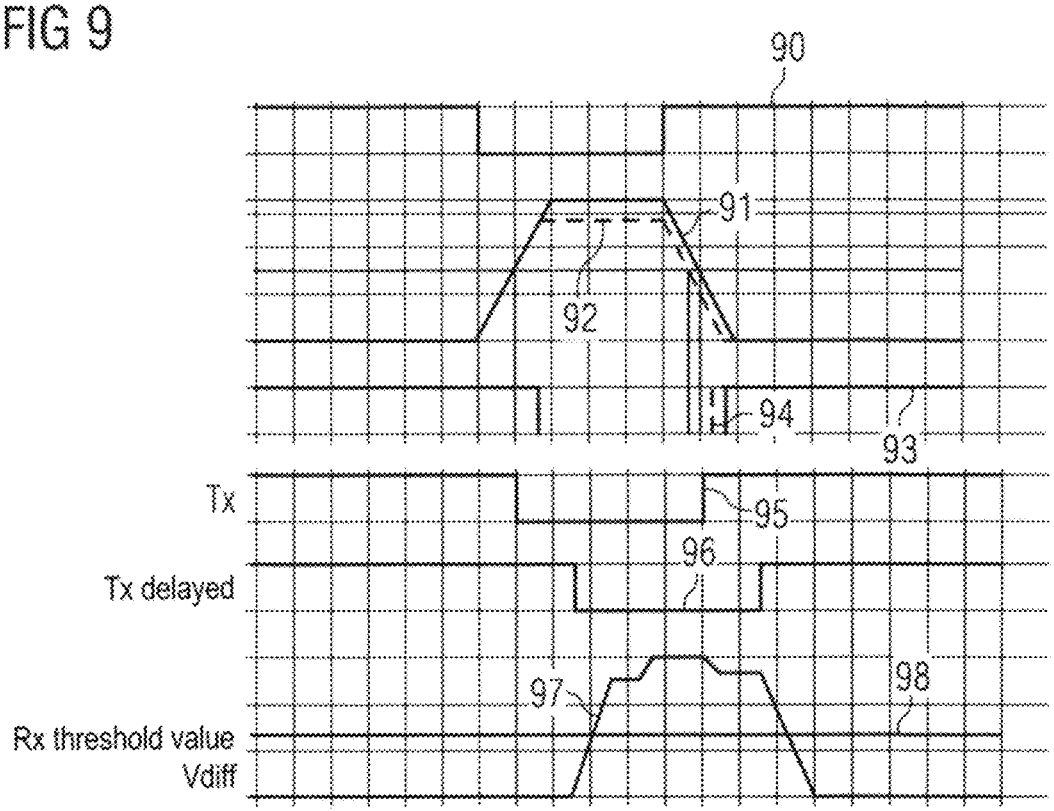

In some implementations, for example in some communication protocols, it can be desirable for signals to behave in the same way in terms of the characteristic of rising and falling edges. The overlaying of the second signal, e.g. modulation of the security code, can mean that this is not ensured in some implementations. As an illustration, FIG. 9 depicts transmit data Tx representing a bit sequence to be sent. A curve 91 shows a case for the overlay signal to be transmitted when a logic high level of the security code is modulated. A dashed curve 92 shows the case of the overlay signal in which a logic low level of the security code is modulated, with switches being closed progressively in the example of the curves 91, 92, as explained with reference to FIG. 5. As can be seen, the rising edges are identical in both cases until the respective signal level is reached. The falling edges can have staggered timing, however. If a particular sampling threshold is used for sampling the signal 91 or 92, this can lead, as indicated by curves 93, 94, to different receive data Rx, the edges of which are slightly staggered. This can be disadvantageous for some applications with high bit rates.

In such a case, the switching to a higher lever for a logic 1 of the security code can be effected with staggered timing, as depicted in a lower part of FIG. 9. In this case, transmit data Tx are again shown, and a characteristic 96 shows a delayed version of the transmit data 95. In this case, the overlay signal 97 is generated without the modulated security code on the basis of the delayed signal 96. By contrast, the modulation of the security code ends with the rising edge of the signal 95, so that the security code is modulated at a distance from the edges of the signal, as shown by the signal 97. In other words, in this case the second signal is overlaid according to the security code after no level change in the first signal has been effected for a particular time and no level change in the first signal will be effected for a particular time. A threshold voltage 98, on the basis of which the signal change in the receive signal is effected, is therefore crossed at the same time irrespective of the modulated security code. The rising edge of the transmit data 95 can also then be used for sampling the security code (see the explanations pertaining to FIGS. 7 and 8 in respect of sampling the security code).

The modulation of the security code as in the overlay signal 97 slightly increases the loop delay, since the delayed transmit data 96 are used as a basis for generating the signal, but the response in terms of rising and falling edges continues to be independent of the modulated security code in some exemplary embodiments.

As already explained above, the security code can be recovered by virtue of the received signal, in the case of a CAN bus the difference voltage, being compared with a threshold value (e.g. threshold voltage). This threshold value is expediently between the two possible levels of the security code, for example between the levels 65 and 66 of FIG. 6. These two levels are relatively close to one another in some exemplary embodiments, for example in order to ensure that both levels are within a tolerance range for an applicable signal level of the signal according to the communication protocol, as explained. In some implementations, the levels can additionally fluctuate on the basis of circumstances such as temperature, supply voltage, manufacturing tolerances of components and the like, which can hamper suitable choice of the threshold voltage in some exemplary embodiments. This is now explained with reference to FIGS. 10 and 11 using the example of a CAN bus, and then various calibration options are subsequently explained that allow a suitable threshold voltage to be determined even in implementations in which such variations arise.

Figure 10:
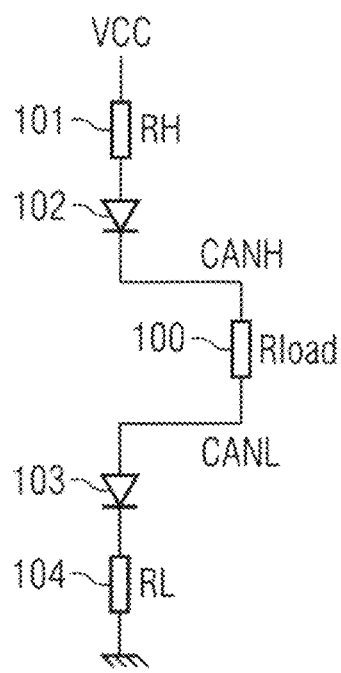
FIG. 10 shows part of a transmitter for a CAN bus.

FIG. 10 schematically shows a driver of a transmitter for a CAN bus in the dominant state. FIG. 10 shows the two lines CANH, CANL, already discussed, of a CAN bus that are accordingly connected to the load resistor 45 of FIG. 4 via a load resistor 100. The load resistor 100 in the case of CAN buses has a value of 60 ohms, with tolerances in a range from approximately 50 ohms to 75 ohms being permitted in this case. The line CANH is connected to a positive supply voltage VCC via a resistor 101 having a resistance value RH and a diode 102, and the line CANL is connected to ground via a diode 103 and a resistor 104 having a resistance value RL. The resistor 101 in this case corresponds for example to those resistors 55, 53, 51 of FIG. 5 whose switches are closed in the dominant state, that is to say is an equivalent circuit diagram of the parallel switches and resistors of FIG. 5 in the dominant state, and the diode 102 corresponds to the diode 57 of FIG. 5. The diode 103 and the resistor 104 correspond to applicable components between CANL and ground. The differential voltage Vdiff between CANH and CANL is calculated as:

$$V_{diff} = (VCC - 2U_d) \cdot R_{load}/(RH + RL + R_{load}),$$

where Rload is the resistance value of the resistor 100 and Ud is the diode voltage of the diodes 102, 103 in the forward direction.

RH and RL vary in this case between the two levels used in the depicted security code. To give a numerical example, it is possible to have RH=RL=20 ohms for one level of the security code and RH=RL=15 ohms for the other level. With example values VCC=5 volts, Rload=60 ohms and Ud=0.7 volt, the above formula then results in Vdiff,low=2.16 volts and Vdiff,high=2.4 volts for the two possible levels with which the security code is modulated. The voltage difference between these two levels is thus a little over 200 mV in this example.

As can be seen from the equation above, the voltage Vdiff is dependent on the supply voltage VCC and the load resistor 100. Also, the variables in the equation, for example the diode voltage Ud, are also dependent on the temperature. The dependency on the supply voltage and on Rload is depicted schematically in FIG. 11. FIG. 12 also illustrates a dependency on the temperature.

Figure 11:
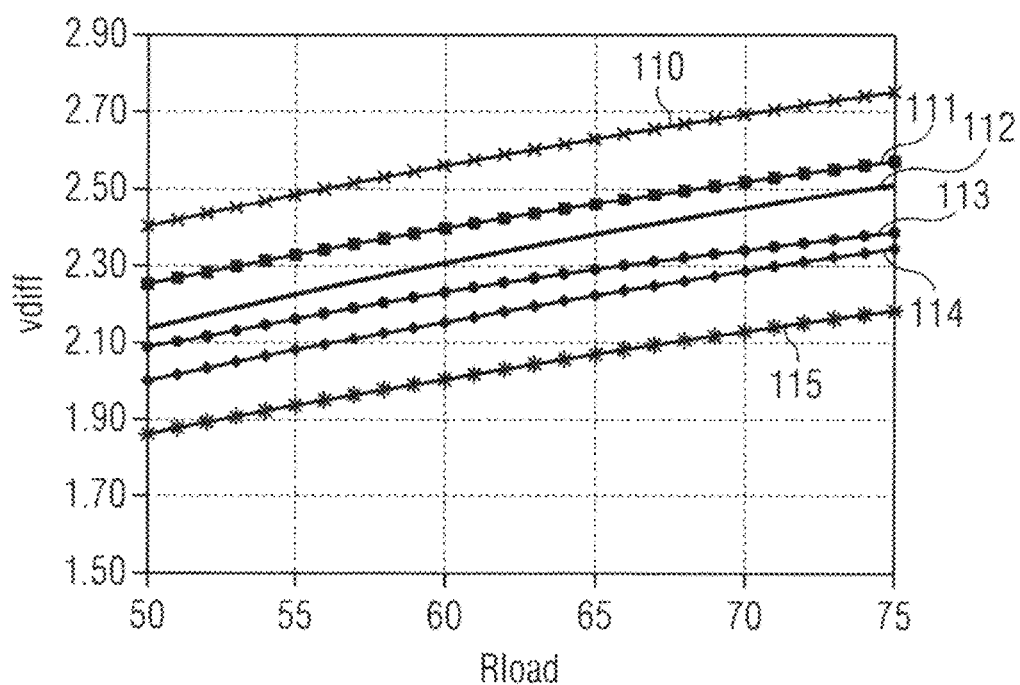
FIG. 11 shows curves for the circuit of FIG. 10 when different parameters are varied.
Figure 12:
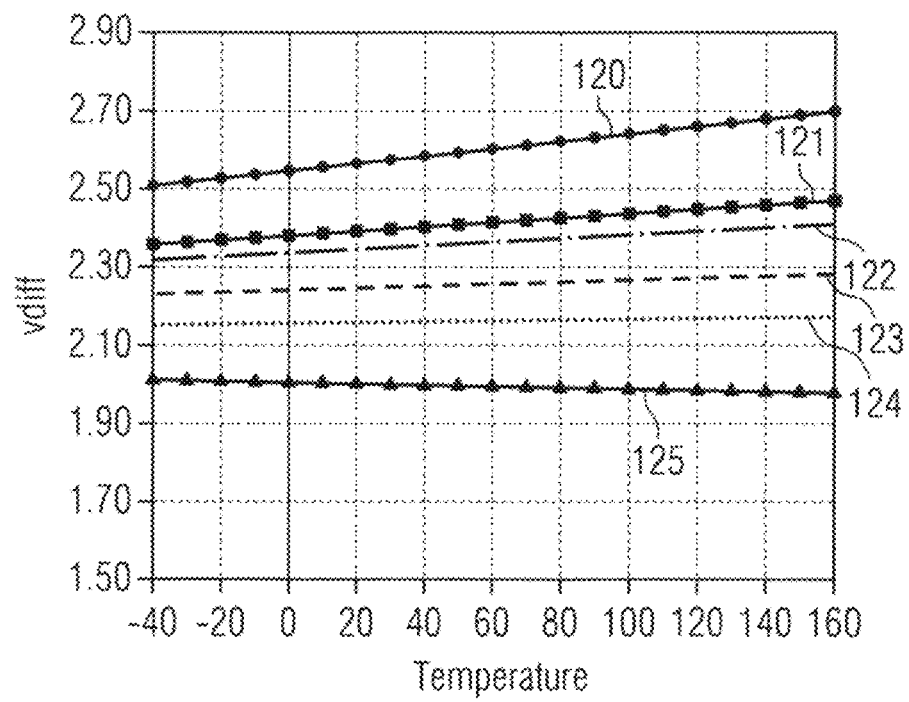
FIG. 12 shows curves for the circuit of FIG. 10 when different parameters are varied.

In FIG. 11, curves 110-115 show the voltage Vdiff according to the above equation across the load resistor Rload. Rload varies in this case between 50 and 75 ohms, which can correspond to a permitted range of variations for CAN buses, for example. In FIG. 12 the voltage Vdiff is plotted over temperature.

The curves 110-115 show the voltage Vdiff for different supply voltages and for a high level (corresponding to the above Vdiff,high) and a low level (corresponding to the above Vdiff,low) for the example values for RH, RL of 15 and 20 ohms as explained above. In particular, the curve 110 shows Vdiff,high for VCC=5.25 volts, the curve 111 shows Vdiff,high for VCC=5 volts, the curve 112 shows Vdiff,low for VCC=5.25 volts, the curve 113 shows Vdiff,high for VCC=4.75 volts, the curve 114 shows Vdiff,low for VCC=5 volts and the curve 115 shows Vdiff,low for VCC=4.75 volts. In FIG. 12, the curve 120 shows Vdiff,high for VCC=5 volts and Rload=75 ohms, the curve 121 shows Vdiff,high for VCC=5 volts and Rload=60 ohms, the curve 122 shows Vdiff,low for VCC=5 volts and Rload=75 ohms, the curve 123 shows Vdiff,high for VCC=5 volts and Rload=50 ohms, the curve 124 shows Vdiff,low for VCC=5 volts and Rload=60 ohms and the curve 125 shows Vdiff,low for VCC=5 volts and Rload=50 ohms.

The external load resistor 100 is not known a priori in this case and can simply vary as explained. The supply voltage can also vary, for example between 4.75 volts and 5.25 volts as indicated in FIG. 11. As can be seen from FIGS. 11 and 12, such implementations, in which such variations can arise, do not allow a single threshold value (i.e. in this case a threshold voltage) to be stipulated that can be distinguished between Vdiff,high and Vdiff,low for all occurring load resistors, voltages and temperatures. E.g. with a threshold value of 2.30 volts as can be seen in FIG. 4, with a resistance Rload above 60 ohms and a supply voltage of 5.75 volts, both Vdiff,high (curve 110) and Vdiff,low (curve 112) would be above this threshold value, which means that a distinction would not be possible. The same also applies to other possible threshold values.

Thus, in some exemplary embodiments in which such variations can arise, a calibration is performed, various options for which are discussed below. In exemplary embodiments in which such variations do not arise or arise to a small extent, on the other hand, a single threshold value can be chosen, and the calibration can be omitted.

Figure 13:
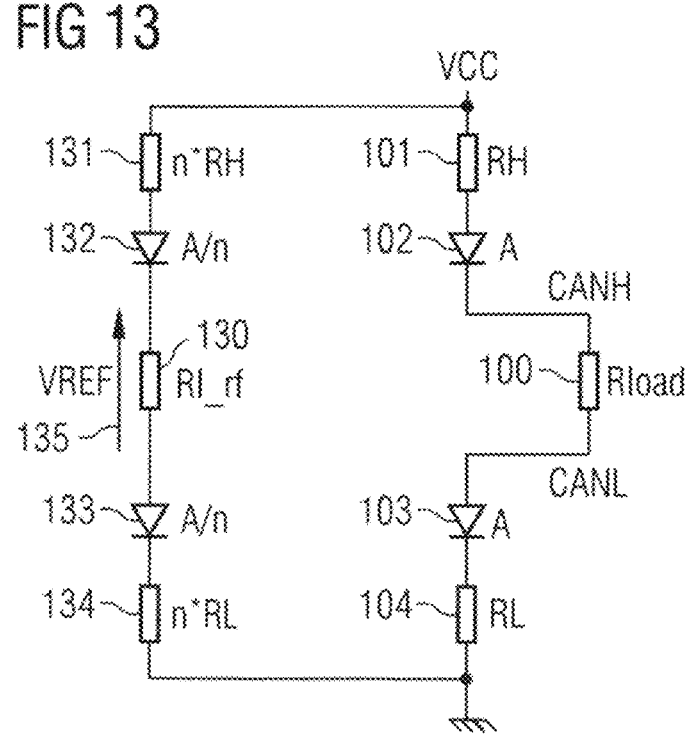
FIG. 13 shows a communication circuit for transceivers according to some exemplary embodiments.

FIG. 13 shows a circuit according to some exemplary embodiments that is used for such a calibration. In the exemplary embodiment of FIG. 13, a replica of the driver depicted in FIG. 10 is provided in order to obtain a reference voltage Vref. A replica of a circuit part is in this case a circuit that generally contains components corresponding to the circuit part that are able to be scaled relative to the circuit part (for example can have a surface area reduced by a scaling factor, can have a resistance increased by a scaling factor, and the like). The replica in the exemplary embodiment of FIG. 13 comprises a resistor 131 corresponding to the resistor 101, a diode 132 corresponding to the diode 102, a diode 133 corresponding to the diode 103 and a resistor 134 corresponding to the resistor 104. As indicated in FIG. 13, the resistors 131, 134 are scaled by a factor n relative to the resistors 101,104, in particular for a factor n higher, which limits the flow of current through the replica. The diodes 132, 133 have a surface area reduced by the scaling factor n in comparison to the diodes 102, 103, which reduces a surface area requirement for the replica and reduces the current draw. At typical values, it can hold that n>30 in order to keep a current draw by the replica below 1 mA. Although distinctly higher values of n would reduce the current draw further, they could impair the matching of the replica to the driver depicted in FIG. 10, depending on the implementation. For the resistors 131, 134, an intermediate value between the values n*RH and n*RL can be used for the high and low levels of the security code in this case. A voltage is then dropped across the resistor 130 that is used as a reference voltage for some exemplary embodiments. Fluctuations in the supply voltage VCC and in the temperature act on the voltage Vdiff and on the reference voltage Vref obtained by the replica in the same way with such a circuit, which means that this can equalize the influence of fluctuating reference voltages and temperatures.

However, this does not yet equalize fluctuations in the resistance value Rload of the resistor 100. Since the resistor 100 is an external resistor in many implementations, it is frequently not known a priori.

Figure 14:
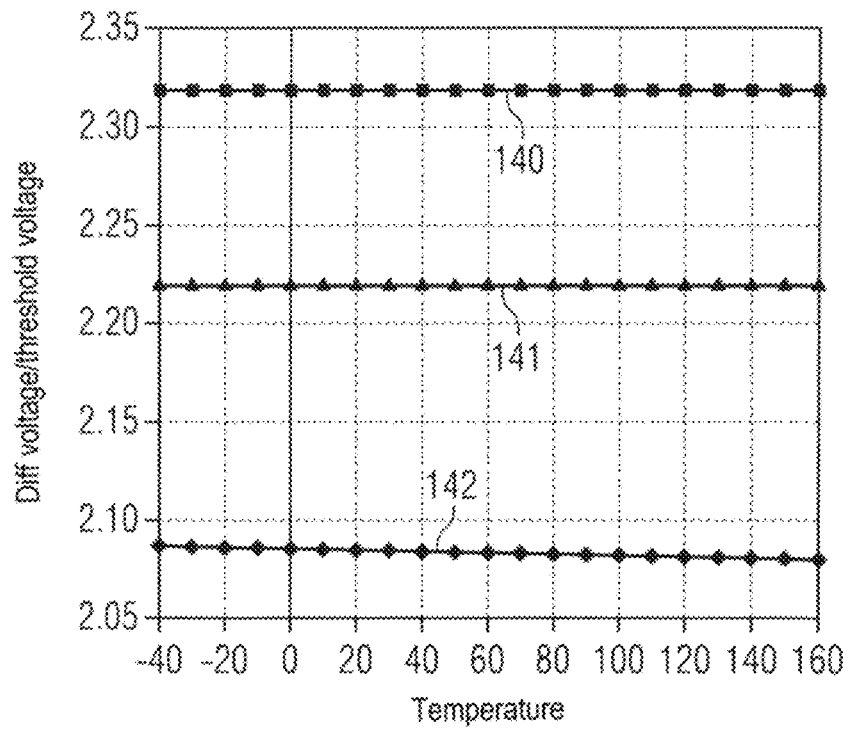
FIG. 14 shows curves to illustrate some exemplary embodiments.

In exemplary embodiments in which such variations in a load resistor arise as influence the levels of the modulated second signal, e.g. on the basis of the discussed security code (in this case the voltage Vdiff), the resistor 130 replicating the resistor 100 can additionally be variable and calibrated to a value RL_RF=n*Rload, n in turn being the scaling. Ways in which such calibration can be performed will be explained in more detail later. The result of such a calibration is depicted in FIG. 14. In FIG. 14, a curve 140 shows the voltage Vdiff,high for a supply voltage of 5 volts and a load resistor Rload of 55 ohms over temperature, and a curve 142 shows the voltage Vdiff,low for the supply voltage and the load resistor of 55 ohms. A curve 141 shows a reference voltage Vref over temperature that has been obtained with a resistor 130 whose resistance value RL_RF has been set to 55 ohms*n. The resistors 131, 134 in this case were each n*17 ohms, i.e. a value between the aforementioned example values of 20 ohms and 15 ohms for low and high levels of the security code.

Similar results are obtained for other values of Rload. Therefore, a calibration of the resistance value RL_RF can, in some exemplary embodiments, produce a reference voltage that can be used as a threshold voltage in order to distinguish between the two levels.

Figure 15:
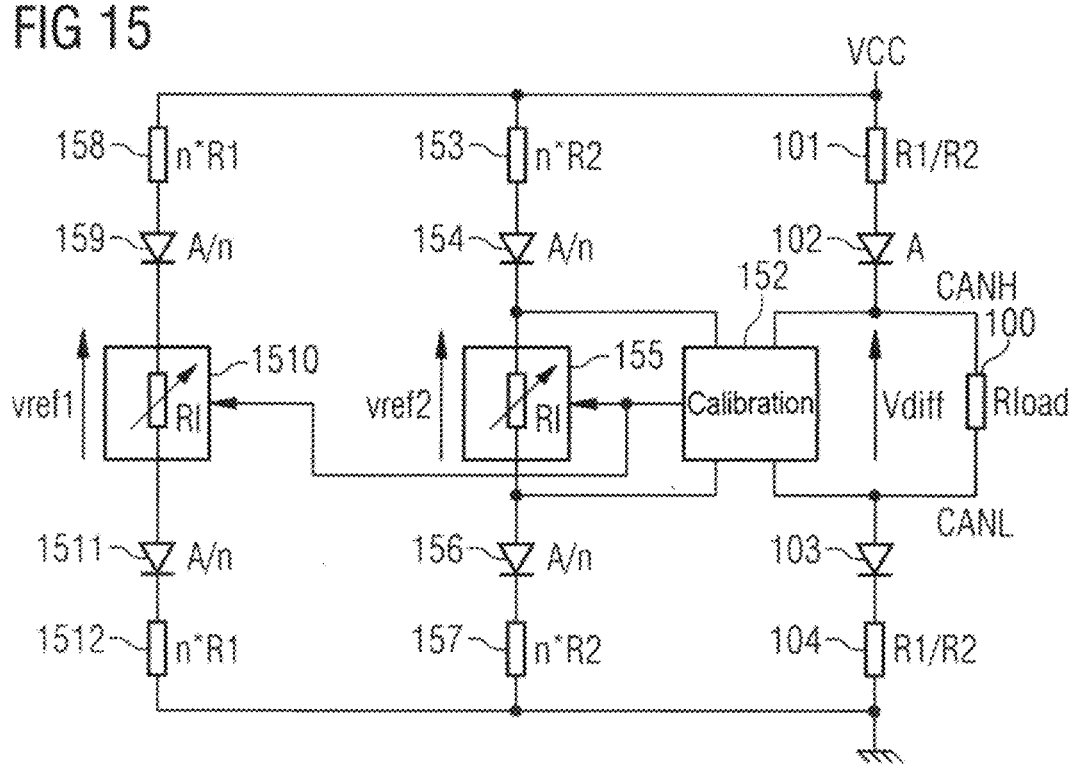
FIG. 15 shows a communication circuit according to some exemplary embodiments.

FIG. 15 shows a calibration circuit according to some exemplary embodiments that can be used to effect such calibration of a replicated resistor for determining a suitable threshold voltage (reference voltage) as a threshold value. FIG. 15 comprises the part of the driver of the transmitter having the reference signs 100-104 that has already been described with reference to FIG. 10. As already explained, the resistors 101, 104 can each assume two different values (e.g. 15 ohms and 20 ohms), and these are denoted by R1 and R2 in FIG. 15. In this case, R1 corresponds to the resistance value for the low level (20 ohms in the above example) and R2 corresponds to that for the high level (15 ohms in the above example), i.e. R2<R1.

The circuit of FIG. 15 comprises two replicas of this driver. A first replica comprises a resistor 153, corresponding to the resistor 101, a diode 154 corresponding to the diode 102, a variable resistor 155 corresponding to the resistor 100, a diode 156 corresponding to the diode 103 and a resistor 157 corresponding to the resistor 104. The diodes 154, 156 are scaled by a factor n relative to the diodes 102, 103 (for example surface area smaller by n) and the resistance values of the resistors 153, 157 are n*R2, i.e. are scaled for the high level of the security code relative to the resistance value of the resistors 101, 104.

A second replica comprises a resistor 158 corresponding to the resistor 101, a diode 159 corresponding to the diode 102, a variable resistor 1510 corresponding to the load resistor 100, a diode 1511 corresponding to the diode 103 and a resistor 1512 corresponding to the resistor 104. The diodes 159, 1511 are in turn scaled by the factor n relative to the diodes 102, 103, that is to say have an n-times smaller surface area, for example. The resistors 158, 1512 are scaled by n relative to the resistance value R1, i.e. for the low level relative to the resistance value.

A calibration circuit 152 measures the differential voltage Vdiff on the resistor 100. For calibration, it is possible for example at the start of a CAN message or during a calibration phase, for the transmit circuit to initially set the resistance R1 for the resistors 101, 104 and then the resistance R2, or vice versa.

Also, the calibration circuit 152 measures the voltage drop across the resistor 155, denoted as Vref2 in FIG. 15, and the voltage drop across the resistor 1510, denoted as Vref1 in FIG. 15, the resistors 155, 1510 being set to the same resistance value.

During the calibration phase, the calibration circuit 152 adjusts the resistor 1510 and the resistor 155, during the phase in which the resistors 101, 104 are set to R1, such that it holds that Vref1=Vdiff. Since the resistors 158 and 1512 are equal to n×R1, it holds, after this adjustment, that the value of the resistors 1510, 155 is equal to n×Rload. In this manner, the resistors 155 and 1510 are thus matched to the resistance value Rload of the resistor such that the reference voltages Vref1, Vref2 correspond to the two possible values of the signal Vdiff for high and low levels of the security code. From the values Vref1, Vref2, it is then possible to determine the threshold value Vref for recovering the security code by virtue of Vref being set to a value between Vref1 and Vref2.

Figure 16:
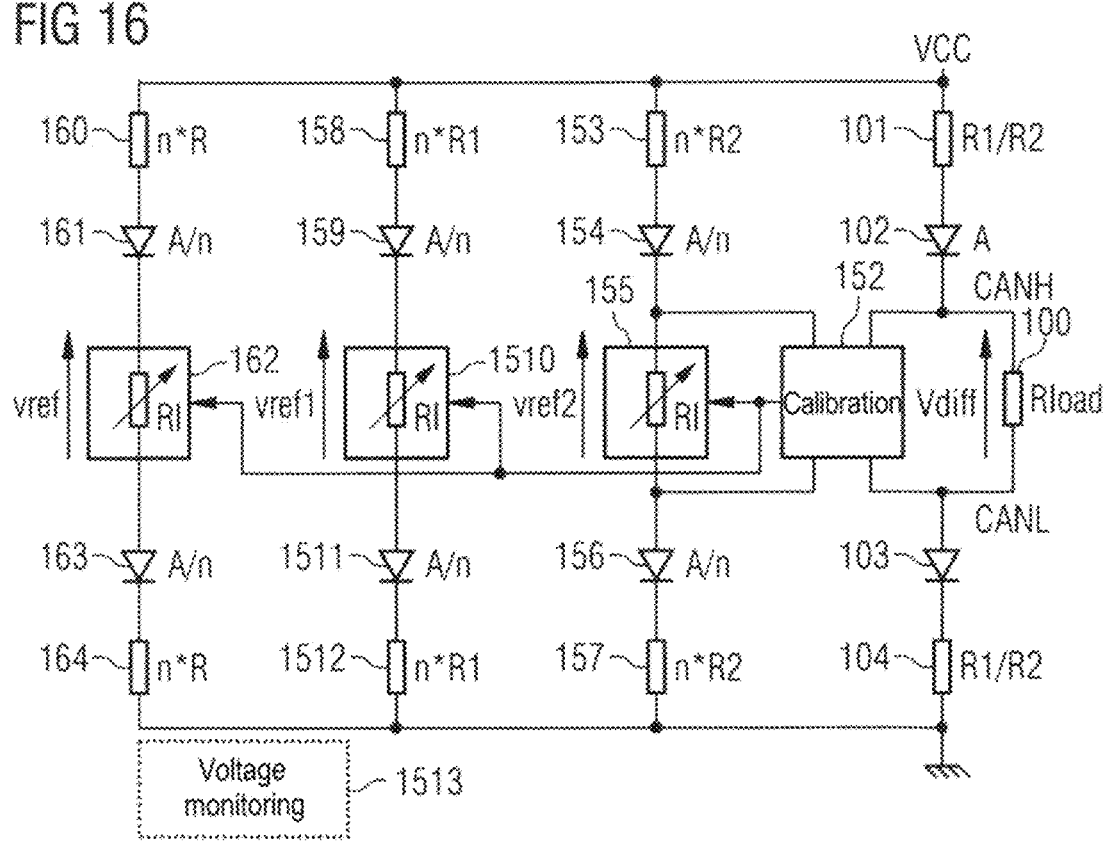
FIG. 16 shows a communication circuit for transceivers according to some exemplary embodiments.

In the exemplary embodiment of FIG. 16, in addition to the two replicas of FIG. 15, a third replica comprising a resistor 160 corresponding to the resistor 101, a diode 161 corresponding to the diode 102, a variable resistor 162 corresponding to the load resistor 100, a diode 163 corresponding to the diode 103 and a resistor 164 corresponding to the resistor 104 is provided. The resistor 160 and the resistor 164 are scaled by a factor n relative to a resistor having a resistance value between R1 and R2. If, as in the numerical example, R1=20 ohms and R2=15 ohms, a resistance value of the resistors 160 and 164 can be for example n*17 ohms or n times another value between R1 and R2. The diodes 161 and 163 are likewise scaled by the factor n in comparison with the diodes 102 and 103, for example have an n-times smaller surface area.

In this case, the resistors 155, 1510 and 162 are adjusted at the same time as explained above, e.g. so that it holds that Vref1=Vdiff in a phase in which the resistors 101, 104 are at R1. The choice of the resistors 160, 164 then results in a reference voltage Vref being dropped across the resistor 162, said reference voltage being between Vdiff,high and Vdiff, low and therefore being able to be used at a threshold value for obtaining the security code from the received signal.

Figure 17:
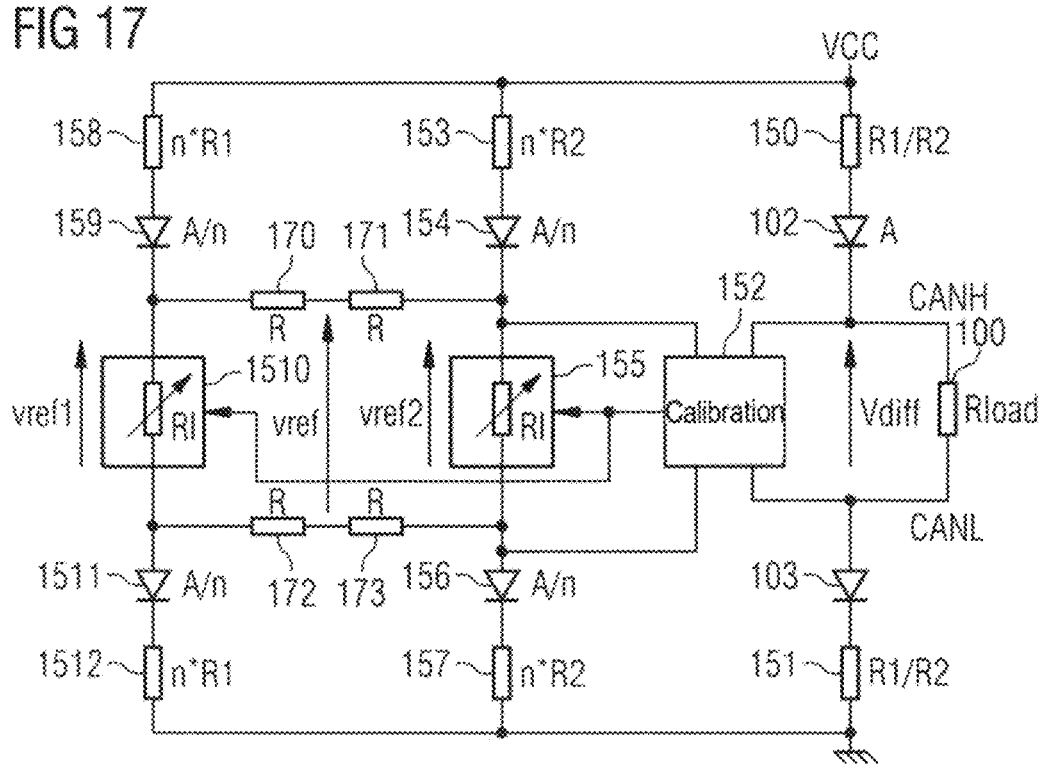
FIG. 17 shows a communication circuit for transceivers according to some exemplary embodiments.

A further way of determining a voltage Vref that can be used as a threshold value is depicted in FIG. 17. In comparison with FIG. 15, resistors 170, 171, 172, 173 are additionally provided in the exemplary embodiment of FIG. 17, said resistors being connected to the resistors 1510, 155 as depicted in FIG. 17. In some exemplary embodiments, all the resistors 170-173 have an identical resistance value R. Between a first node, which is situated between the resistors 170, 171, and a second node which is situated between the resistors 172, 173, it is then possible for a voltage Vref that can be used as a threshold value to be tapped off. If all the resistors 170-173 have an identical resistance value, it holds that Vref=(Vref1+Vref2)/2. By changing the resistance values 170-173, this can be altered, for example Vref can be pushed closer to Vref1 or closer to Vref2. In exemplary embodiments, the resistors 170-173 have higher resistance values than the resistors 153, 157, 158 and 1512. In some exemplary embodiments, this can reduce an error in the determination of the reference voltage Vref.

In some exemplary embodiments, interference can occur on communication lines such as for example bus lines, in the case of a CAN bus the lines CANH, CANL. Examples of such interference include radiofrequency interference (RF interference), which can arise as a result of electromagnetic crosstalk (EMI, electromagnetic interference), for example.

If such interference occurs during the described calibration processes, it can distort the result of the calibration. To avoid this, some exemplary embodiments can involve measures being taken. By way of example, in the exemplary embodiment of FIG. 16, additional voltage monitoring 1513 can optionally be provided that monitors the voltage on the bus lines CANH, CANL and checks whether these are in a permitted range. In the case of a CAN bus, the permitted value can be between 1 and 4 volts, for example. In the case of other communication media, there can be other permitted ranges.

A calibration, i.e. an adjustment of the resistors 1510, 155, according to the measured voltage Vdiff, is valid only if the voltages on the buses on the lines CANH, CANL are in the permitted range. If they are outside the permitted range, the calibration is invalid and needs to be repeated.

Figure 18:
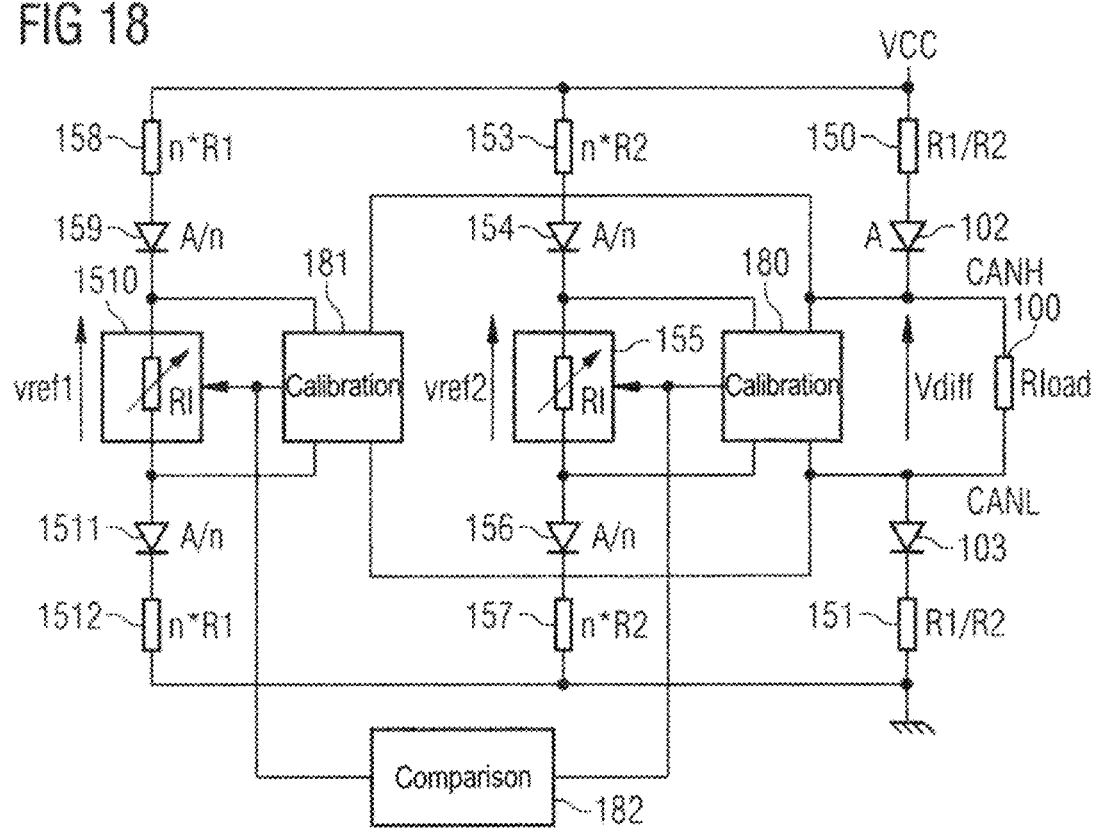
FIG. 18 shows a communication circuit for transceivers according to some exemplary embodiments.

In another exemplary embodiment, which is depicted in FIG. 18, the resistors 1510 and 155 can be adjusted independently of one another by two calibration circuits. Accordingly, in comparison with FIG. 15, the calibration circuit 152 in FIG. 18 is replaced by a first calibration circuit 180 for adjusting the resistor 155 and a second calibration circuit 181 for adjusting the resistor 1510. The calibrations can be effected with staggered timing in this case. A comparison circuit 182 compares the calibration results. If calibration is correct, the resistance values set for the resistors 155 and 1510 should be at least approximately the same. If they differ by more than a prescribed threshold value, the setting of the resistors 155, 1510 is rejected in some exemplary embodiments, and the calibration is repeated. These measures for ensuring a successful calibration, which can also be referred to as validating the calibration, that have been explained with reference to FIGS. 16 and 18 are also applicable to other exemplary embodiments, for example the exemplary embodiment of FIG. 17.

In some exemplary embodiments, the calibration explained above is performed only in some phases of a communication. By way of example, a CAN bus has phases of communication such as an arbitration of phase at the beginning of the communication, in which many transmitters can be in a dominant state. A calibration at such a time could distort the result of the calibration in some cases. Thus, in some exemplary embodiments, a calibration is performed outside such an arbitration phase.

Figure 19:
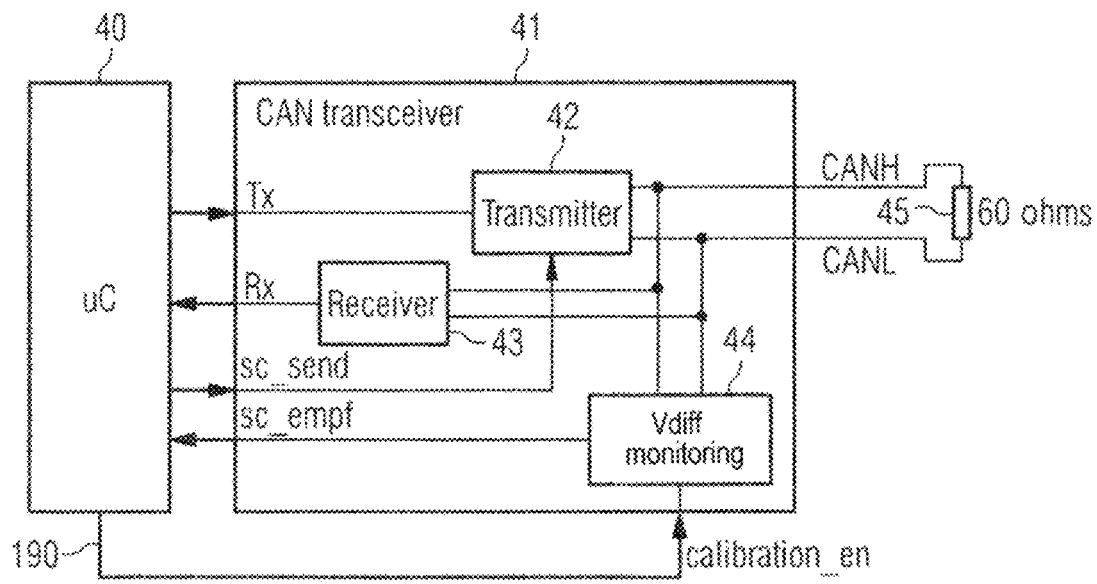
FIG. 19 shows a communication circuit for transceivers according to some exemplary embodiments.

In some exemplary embodiments, the calibration can be activated by a separate signal from a microcontroller or another controller. An example of this is depicted in FIG. 19. The exemplary embodiment of FIG. 19 is a modification of the exemplary embodiment of FIG. 4, and identical components bear the same reference signs and are not explained again.

In addition to the components depicted in FIG. 4, the microcontroller 40 can, as represented by an arrow 190, activate and deactivate the calibration using a signal calibration_en. As such, the microcontroller 40 can e.g. deactivate the calibration during the aforementioned arbitration phase.

Various options have been explained above for how, with the variable external resistor such as the load resistor 100, a calibration can be effected in order to obtain a reference voltage Vref as a threshold value.

In other exemplary embodiments, a difference between voltage levels for the security code can be chosen such that an identical reference voltage that does not need to be calibrated can be used in an entire permitted range of load resistors. This can be regarded as calibration of the driver at the transmitter end. An applicable exemplary embodiment is depicted in FIG. 20.

FIG. 20 again shows the described part of the transmit circuit having the reference signs 100-104. Also, a replica is provided in which a resistor 201 corresponds to the resistor 101, a diode 202 corresponds to the diode 102, a resistor 200 corresponds to the resistor 100, a diode 203 corresponds to the diode 103 and a resistor 204 corresponds to the resistor 104. The diodes 202 and 203 are scaled by a scaling factor n relative to the diodes 102 and 103, e.g. having an n-times smaller surface area. The resistor 200 is scaled by the factor n relative to a mean resistance value of the load resistor 100. In the case of a CAN bus, the resistor 200 can have a resistance value of n*60 ohms, for example. The resistors 201 and 204 are scaled by the scaling factor n relative to a mean value of the resistors 101, 104. As already explained, the resistors 101, 104 can assume two different values for producing two levels for modulating the security code, and the resistors 201, 204 are scaled relative to an intermediate value.

Figure 20:
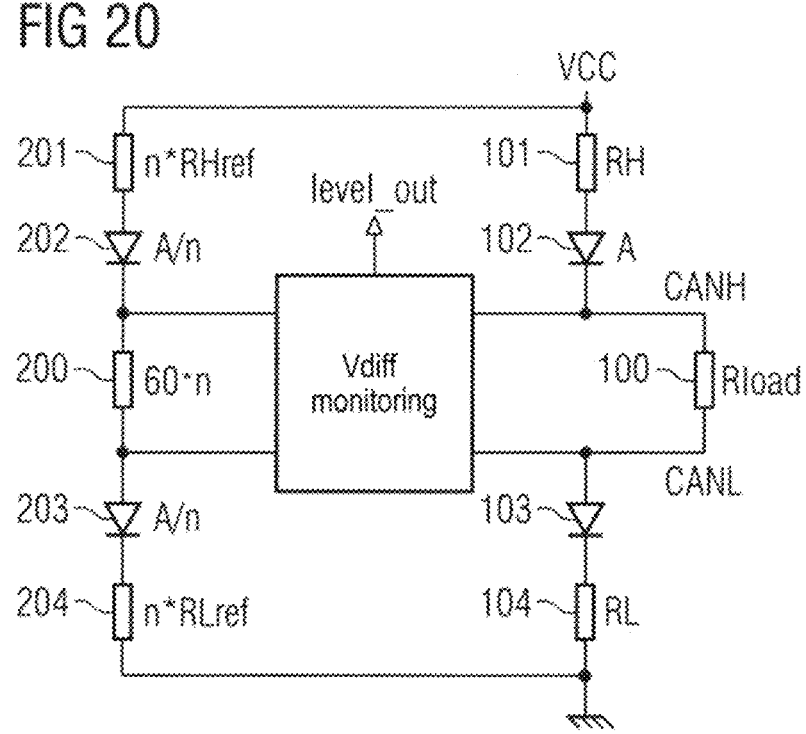
FIG. 20 shows a communication circuit for transceivers according to some exemplary embodiments.

To give a numerical example, in the exemplary embodiment of FIG. 20, the resistors 101, 104 can be set either to 10 ohms for a high level or to 20 ohms for a low level, corresponding to a difference of approximately 500 mV between the levels for the numerical examples already used above. The resistors 201, 204 can then have a value of n*15 ohms, or n*another value between 10 ohms and 20 ohms, for example n*14 ohms. The voltage drop across the resistor 200 is then used as a reference voltage for recovering the security code. In such exemplary embodiments, no calibration of the resistor 200 is necessary. In some exemplary embodiments, however, the surface area requirement is higher owing to the greater distance between the two values of the resistors 101, 104. Also, the difference between the levels cannot be chosen to be at any level, depending on the communication protocol used, if the backward compatibility explained above, in which the levels are kept in specified ranges, is meant to be preserved.

Figure 21:
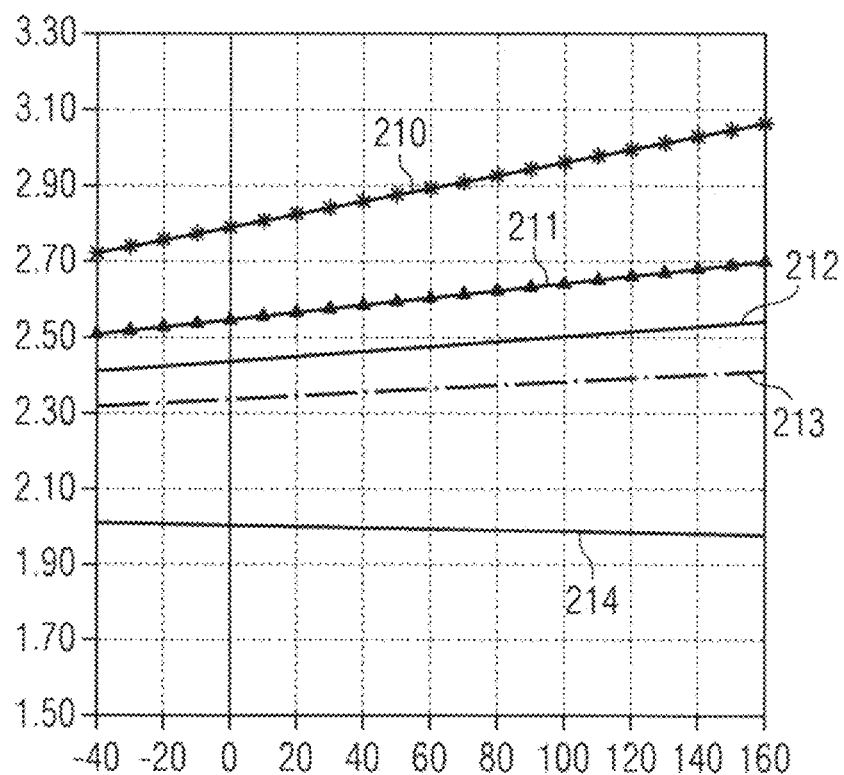
FIG. 21 shows curves to illustrate some exemplary embodiments.

FIG. 21 shows simulation results for a circuit as explained with reference to FIG. 20. FIG. 21 shows in particular voltages Vdiff,high and Vdiff,low over the temperature in degrees Celsius for various load resistors Rload and a constant supply voltage VCC=5 volts. A curve 210 shows Vdiff,high for Rload=75 ohms, a curve 211 shows Vdiff,high for Rload=50 ohms, a curve 213 shows Vdiff,low for Rload=75 ohms and a curve 214 shows Vdiff,low for Rload=50 ohms. A curve 212 shows the reference voltage across the resistor 200 of FIG. 20 for a resistance value of n*60 ohms. As can be seen, for the entire range of Rload from 50 ohms to 75 ohms, a distinction can be drawn between Vdiff,high and Vdiff,low by means of the reference voltage 212 according to the curve 212.

Therefore, an exemplary embodiment without the calibration explained above is also possible, for example by virtue of, as explained with reference to FIG. 20, the possible resistance values for the resistors 101, 104 being chosen such that the interval between Vdiff,high and Vdiff, low is sufficiently large.

Figure 22:
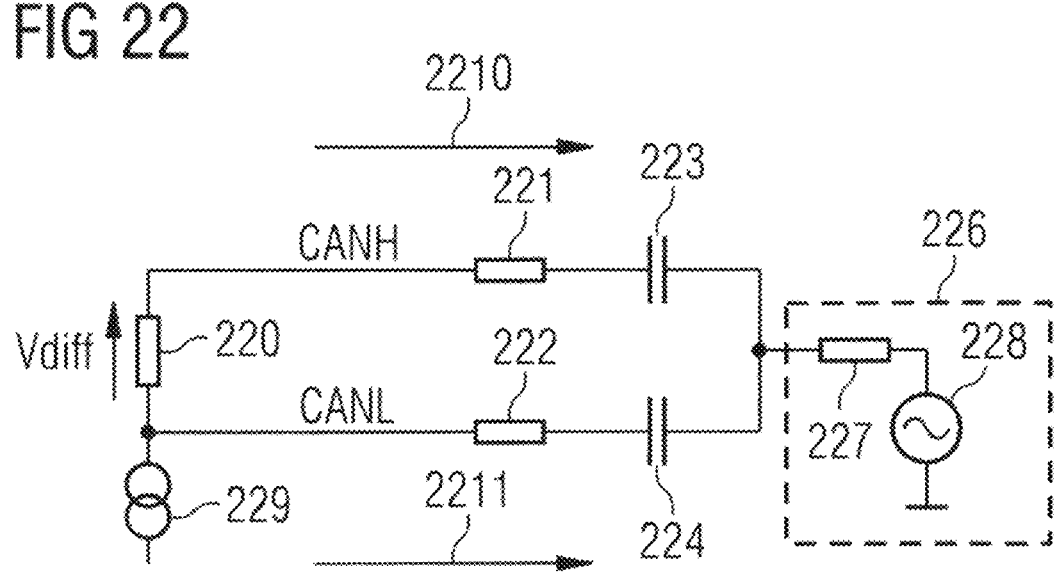
FIGS. 22 and 23 show graphs to illustrate the influence of electromagnetic interference.
Figure 23:
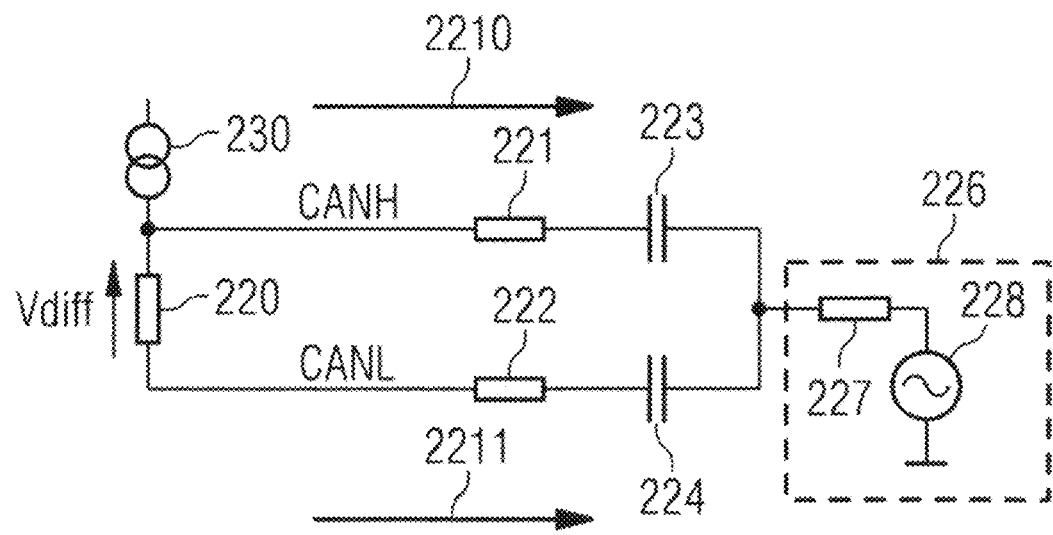

As explained above, the difference between Vdiff,low and Vdiff,high is generally relatively small, for example approximately 200 mV or approximately 500 mV in the examples above. This signal can be influenced by electromagnetic interference. To improve electromagnetic compatibility (EMC), some exemplary embodiments can involve measures being taken in order to at least reduce the effects of electromagnetic interference on the signal. This is now explained with reference to FIGS. 22 and 23. FIGS. 22 and 23 each show an equivalent circuit diagram for an output stage of a CAN bus having lines CANH, CANL under the influence of electromagnetic interference.

In both FIG. 22 and FIG. 23, the reference sign 220 denotes the output resistance (corresponding to the resistor 100 in the previous figures), which is approximately 60 ohms. Each line CANH, CANL is depicted with a resistor 221, 222, which is approximately 120 ohms in the example depicted. Additionally, a capacitance 223 or 224 having a capacitance value of 4.7 Nano farads is provided. The resistors 221, 222 and the capacitances 223, 224 represent an injection network by means of which interference is injected into the bus lines CANH, CANL.

In the case of FIGS. 22 and 23, electromagnetic interference is injected into the lines CANH, CANL via the injection network (221-224) by an interference source 226, depicted with AC voltage source 228 and resistor 227. In the case of such interference, Vdiff is provided by a short-circuit current, which corresponds to a maximum possible flow of current, since in this case current limiting occurs on the side coupled to CANH or the side coupled to CANL of a driver. This driver is represented in FIG. 22 by a current source 229 and in the case of FIG. 23 by a current source 230. At high voltages (e.g. as a result of interference), drivers with current limiting behave like a current source. The current sources 229 and 230 therefore also represent the short-circuit current that flows to a positive voltage, such as VCC, in the case of FIG. 22 and to ground in the case of FIG. 23. Such current limiting can occur for example as a result of a maximum flow of current in a switch implemented by one or more transistors, such as in the switches 56, 54, 52 of FIG. 5.

In both cases, the short-circuit current flows via both lines CANH, CANL in the same manner, as indicated by arrows 2210, 2211 in FIGS. 22 and 23.

The resultant difference voltage Vdiff is Vdiff= Rload*ishort/2 in this case, where ishort is the short-circuit current.

Suitable choice of current limiting for this short-circuit current allows the effect to be achieved even with electromagnetic interference the voltage Vdiff remaining substantially unaltered. In particular, the short-circuit current ishort can be set such that it is twice the current flowing in the normal state (i.e. current flowing in the dominant state). Such current limiting can be achieved in any conventional manner, for example by means of a current mirror.

As explained above, Vdiff=(VCC−2Ud)*Rload/(RH+ RL+Rload) (in the case without electromagnetic interference).

With the aforementioned condition that the short-circuit current ishort is twice the current flowing under normal conditions, the following is obtained ishort=2*(VCC−2Ud)/(RH+RL+Rload).

Thus, the voltage Vdiff,en is under the influence of electromagnetic interference:

Vdiff,en=Rload*ishort/2=Rload*(VCC−2Ud)/ (RH+RL+Rload), and therefore the same as the above value of Vdiff without the influence of electromagnetic interference. Therefore, the above-described limiting of the short-circuit current can at least reduce, if not eliminate, the influence of electromagnetic interference on the difference voltages Vdiff in some exemplary embodiments. In this case, the current limiting value ishort can be changed in each case according to the change in RH and RL for the difference levels of the second signal. In other exemplary embodiments, it is also possible for a mean value for ishort to be formed for the different values of RH, RL.

The text above has discussed many exemplary embodiments in which a first signal with a cryptographic datum is modulated on a physical level onto a signal. In addition to this security code, coding can also be effected in a logic protocol layer, i.e. the information to be sent is encrypted on the basis of a (secret) key, which can be identical to a key used for generating the cryptographic datum, or can be different therefrom. As explained below, a level of redundancy with diversity at the same time (different security methods, encryption on the logic protocol layer and overlaying with the second signal with the cryptographic datum) can be provided as a result. Such encryption by means of keys can be implemented in various manifestations in a conventional manner.

FIG. 24 shows an applicable communication circuit arrangement according to an exemplary embodiment having a first communication circuit 241, used as a transmitter, and a second communication circuit 242, used as a receiver. The exemplary embodiment of FIG. 24 is based in this case on the exemplary embodiment of FIG. 1, and mutually corresponding elements bear the same reference signs. In particular, the modulation of a second signal with a cryptographic datum is effected on a physical level, as described with reference to FIG. 1, all of the variants and implementation options described with reference to FIG. 1-23 being applicable in this case.

Therefore, only the difference between the communication circuit arrangement 240 and the communication circuit arrangement 10 of FIG. 1 are explained below.

In the communication circuit 241, information to be sent is supplied to a signal generation and coding circuit 245. The signal generation and coding circuit encrypts the information based on a key on a logic protocol layer that operates according to a logic protocol. On the basis of the thus encrypted information, a transmit signal is then generated, as described for the generation of a signal by the signal generation circuit 15 of FIG. 1, with the difference that now the encrypted information is used as a basis. This signal then has the second signal with the cryptographic datum 14 modulated onto it in the modulation circuit 16 as described, and the signal is transmitted via the communication medium 13.

In the communication circuit 242, firstly the code receive circuit 18 already described recovers the security code modulated in the modulation circuit 16. Secondly, a signal receive and decoding circuit 247 is used to recover the encrypted information from the received signal, and then the encrypted information is decrypted in a logic protocol layer. To this end, the signal receive and decoding circuit has the key used for encryption available or a decryption key accordingly suited thereto.

This encryption and decryption can be effected in any conventional manner.

If the cryptographic datum obtained by the code receive circuit 18 does not correspond to the expected security code, the measures described can be taken. These measures can correspond to the measures already described. Also, if the decryption in the signal receive and decoding circuit 247 proceeded correctly, it is also possible for just a warning to be output, or it is possible for no measures to be taken if the authentication by means of the successful decryption solely on the logic protocol layer is acceptable. Thus, in this manner, a level of redundancy with two different security mechanisms (encryption on the logic protocol layer and modulation of a second signal with a cryptographic datum on the physical layer) with diversity at the same time (two different measures) is provided.

FIG. 25 depicts an applicable method according to some exemplary embodiments. The method of FIG. 25 can be implemented in the communication circuit arrangement 240 of FIG. 24 and is described with reference thereto to avoid repetition, and can also be used independently of the communication circuit arrangement 240, however.

As already explained for the method of FIG. 2, the method steps of FIG. 25 do not necessarily have to be performed in the order depicted, and in particular different processes can also be performed at the same time.

At 250, information is encrypted, for example on the basis of a key, as described for the signal generation and coding circuit 215. At 251, the encrypted information is converted into a first signal, in particular based on a physical communication protocol, such as the CAN protocol discussed or another communication protocol.

At 252, the first signal is overlaid by a second signal with a cryptographic datum. The cryptographic datum can be a datum derived from an identical key to that used for the encryption at 250 or else another cryptographic datum.

The overlay signal thus generated is sent to a receiver, and at 253 the encrypted information is recovered from the transmit signal. At 254, the encrypted information is the decrypted. At 255, the cryptographic datum is also recovered from the overlay signal. Depending on whether the decryption at 254 and/or the cryptographic datum obtained at 255 is concordant with an expected cryptographic datum, the information can be regarded as authenticated, i.e. sent by an authorized receiver, as has likewise already been described.

The functionalities described can be implemented in different ways. In particular, some of the functionalities, for example the providing of the security code matched to the data to be sent, can be provided in a microcontroller, as described for the microcontroller 40 of FIG. 19, which then passes appropriate information to a CAN transceiver such as the CAN transceiver 41 of FIG. 19 and receives it therefrom. Details of such implementation options are now explained with reference to FIG. 26-36.

Figure 26:
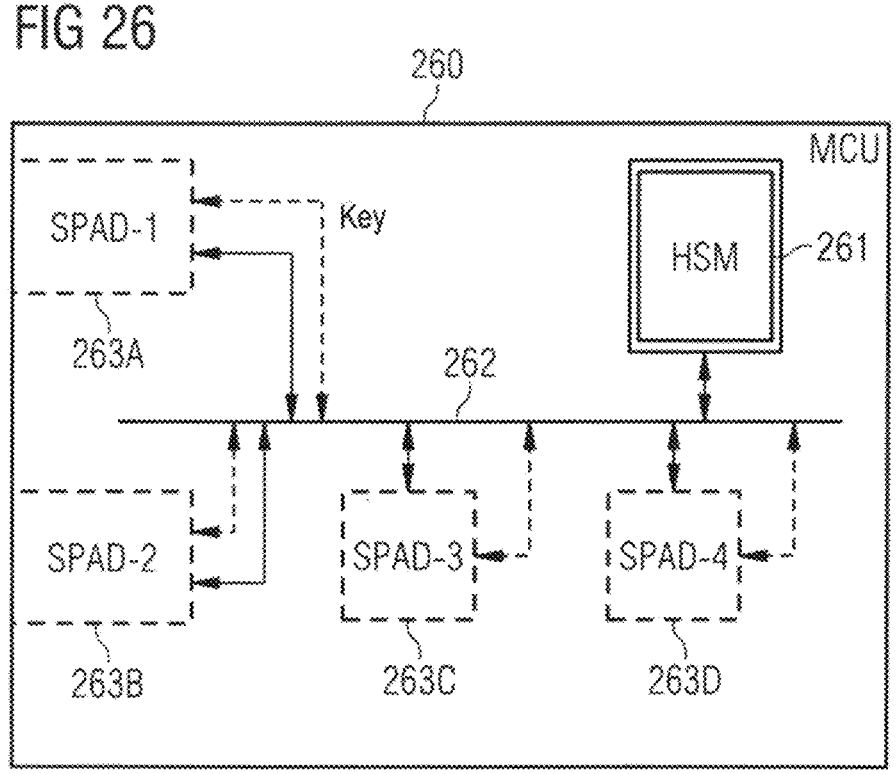
FIGS. 26-36 show communication circuits for transceivers according to some exemplary embodiments.

FIG. 26 shows a block diagram of a microcontroller 260 according to an exemplary embodiment.

The microcontroller 260 can be for example a control unit (MCU, microcontrol unit) of a vehicle, for example an engine controller, gearbox controller or other control unit. A vehicle frequently has a multiplicity of such control units installed in it.

Besides the functions of the microcontroller 260, and also of subsequently described microcontrollers, that are explicitly depicted below, there can be further conventional functions implemented in the microcontroller 260.

The microcontroller 260 has a hardware security module (HSM) 261 storing keys that can be used as a cryptographic datum for the methods and apparatuses described above, and from which a cryptographic datum of this kind, e.g. the security code described, is generable. The hardware security module 261 is protected against access and interference, such as interference from particles, electromagnetic radiation and the like, by additional measures, which are known in themselves. It is also protected against attacks and access better than the rest of the microcontroller 260. Software of the hardware security module 261 can run e.g. in separate memory areas, and algorithms can be side channel resistant.

The microcontroller 260 also contains one or more circuit parts 263A-263D referred to as SPAD (safe physical anomaly detection) that implement the techniques described. In particular, each SPAD 263A-263D (subsequently referred to as SPAD 263 in summary) can provide a security code to be modulated for a transceiver such as a CAN transceiver, as has been explained with reference to FIG. 4. The number of four SPADs 263 in FIG. 26 serves merely as an example in this case, and any required number of SPADs can be chosen.

The SPADs 263 receive control and data information via an internal bus 262 of the microcontroller. By way of example, the data and information to be sent can thus be provided in consideration of a position of transmit and receive bits as explained with reference to FIG. 3. Additionally, the SPADs 263 obtain keys from the hardware security module 261. This can be effected either also via the control and data bus 262 or also via separate connection as indicated by dashed lines. These keys can then be used as a cryptographic datum for the techniques described above, or a cryptographic datum, such as the security code discussed, can be generated from the keys according to the prescribed algorithm.

The SPADs can each be associated with communication interfaces. This is depicted schematically in FIG. 27. In this case, a microcontroller 270 comprises SPADs 273A-274D and the hardware security module 261 of FIG. 27. The SPADs 273A-273D are referred to as SPADs 273 in summary below, the number of four SPADs 273 again being intended to be understood as a nonlimiting example. Each of the SPADs 273 is associated with a respective communication interface 274A, 274B, 274C or 274D (referred to as communication interfaces 274 in summary). The communication interfaces 274 can be coupled for example to CAN transceivers as described or to transceivers for other types of buses, but are not restricted thereto.

Figure 27:
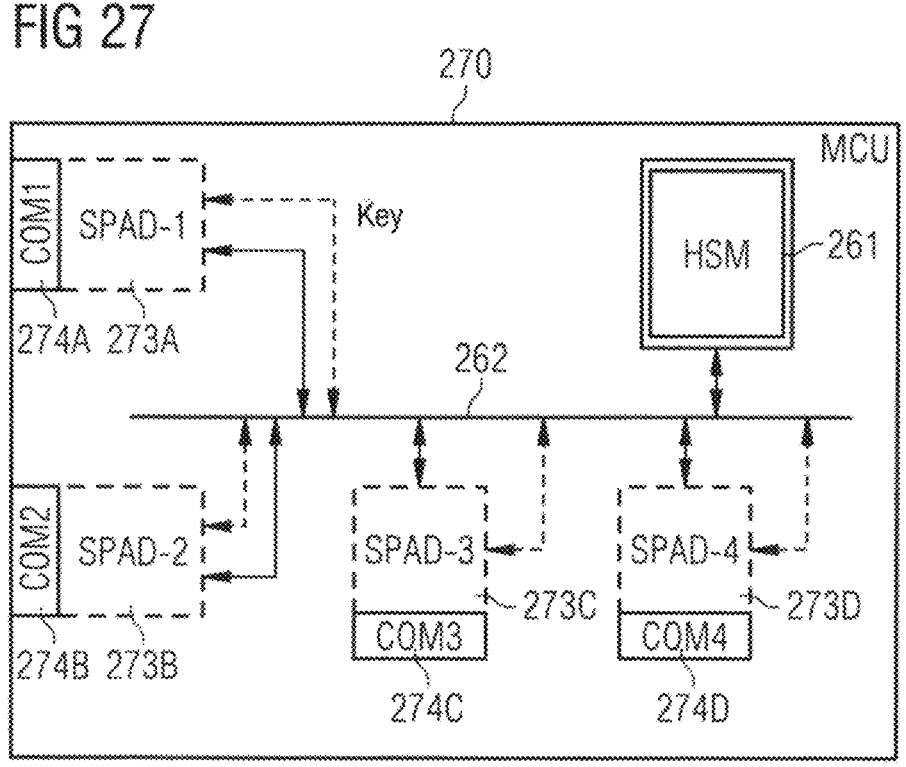
Figure 28:
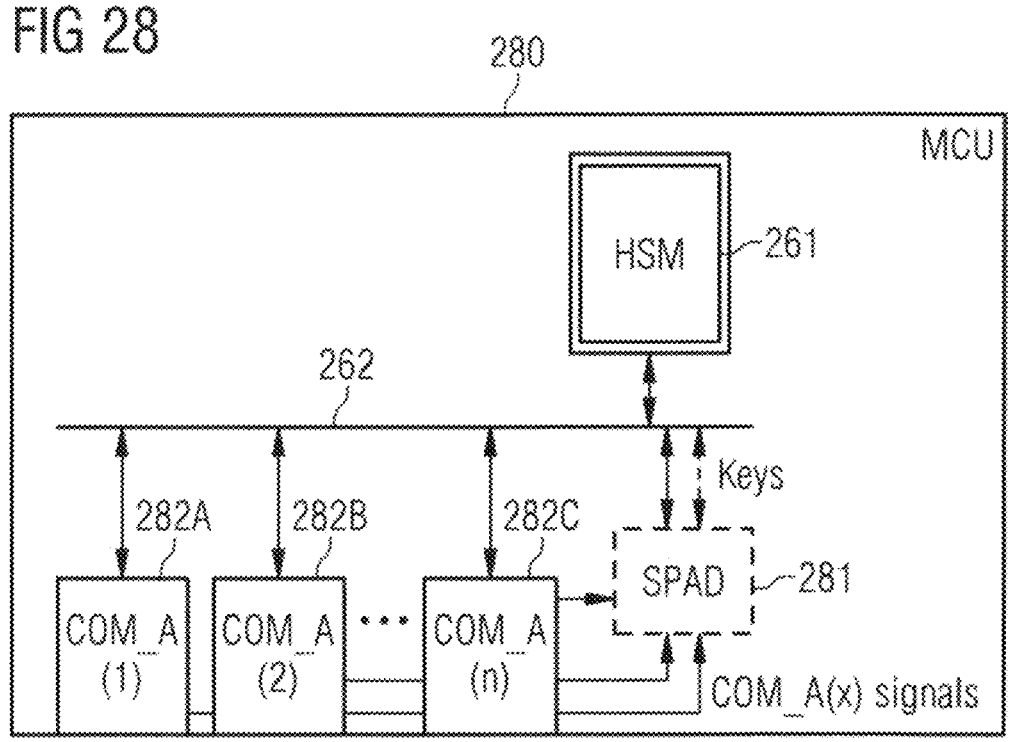

In the exemplary embodiment of FIG. 27, each SPAD 273 is associated with a respective communication interface 274. In other exemplary embodiments, a SPAD can be associated with multiple communication interfaces. An applicable exemplary embodiment is depicted as a microcontroller 280 in FIG. 28. FIG. 28 shows a microcontroller 280 with the hardware security module 261 already described and the internal bus 262. The bus has communication interfaces 282A-282C connected to it, referred to as communication interfaces 282 in summary. The communication interfaces 282 can be seen as submodules of a single communication interface associated with a single SPAD 281. The SPAD 281 performs the described techniques for all the communication interfaces 282A-282C. The number of three depicted communication interfaces 282 in FIG. 28 is again merely an example in this case. Therefore, FIGS. 27 and 28 show that SPADs can be associated with communication interfaces in different ways. Hybrid forms between FIGS. 27 and 28 are also possible in which some SPADs are associated with multiple communication interfaces and other SPADs are associated only with a single communication interface.

Figure 29:
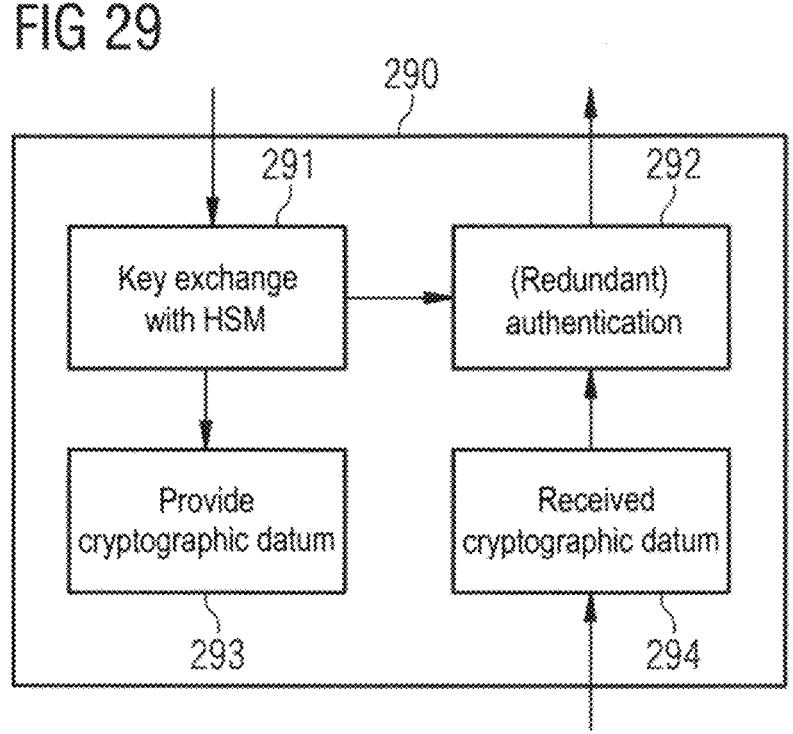

FIG. 29 shows a block diagram of a SPAD 290, as is useable for example as a SPAD in FIGS. 26, 27 and 28.

The SPAD 290 comprises a module 291 for key exchange with a hardware security module such as the described hardware security module 261 of FIG. 26-28. Based on a received key, a module 293 provides a security code for modulating onto a signal on a physical level, as described. A module 294 receives a security code obtained from a received signal and, in a module 292, performs an authentication on the basis of a received key that indicates an expected security code, as described. The authentication at 292 can be effected redundantly in this case. By way of example, it is also possible, as described, for coding of the sent information to be effected on a logic protocol layer, or the check on the received security codes can be performed redundantly in multiple circuit parts. Depending on the success of the authentication, it is then possible for a signal to be output that indicates a successful or failed authentication, and a failed authentication can result in measures being taken as described.

As already explained above, an apparatus such as a vehicle can have a multiplicity of microcontrollers arranged in it.

In some exemplary embodiments, information about successful or failed authentications can be collected from multiple microcontrollers, and this collection can then be taken as a basis for taking measures. This is depicted schematically in FIG. 30.

Figure 30:
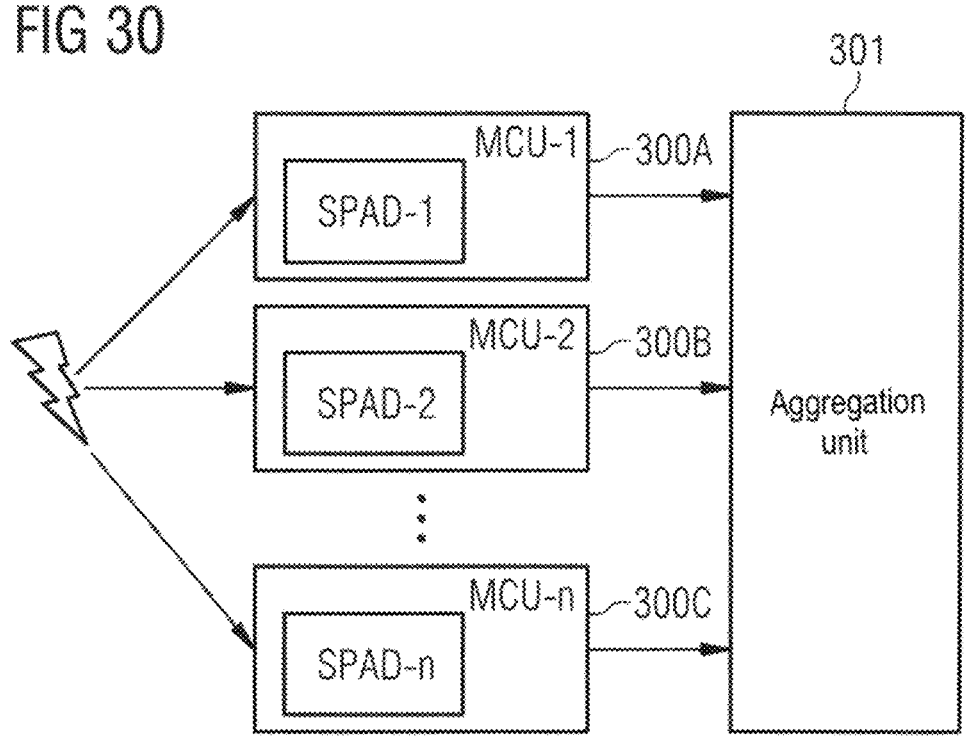

FIG. 30 shows a multiplicity of microcontrollers 300A, 300B, 300C (the number of three microcontrollers is again intended to be understood as an example and not by way of limitation) that each contain a SPAD as described above for authentication and that are connected to a communication medium, for example a common bus. Each of the microcontrollers 300 performs authentication measurements (e.g. the described checks on a received cryptographic datum) on the bus and reports information about the authentications (for example about failed authentications) to an aggregation unit 301. The aggregation unit 301 evaluates the received information and causes further measures. By way of example, if only one MCU cannot authenticate a signal, some exemplary embodiments can result in no measure being taken yet, since this could also involve a transmission error, for example. If multiple microcontrollers receive unauthenticatable messages, this can be rated as an attempt at penetration, for example, and a measure can be taken, as described. This likewise provides a level of redundancy for the detection of communication apparatuses coupled without permission and can therefore contribute to meeting security requirements.

A SPAD can receive signals from a transmission medium such as the transmission medium 13 of FIG. 1 in different ways. This is now explained in more detail with reference to FIG. 31-35.

Figure 31:
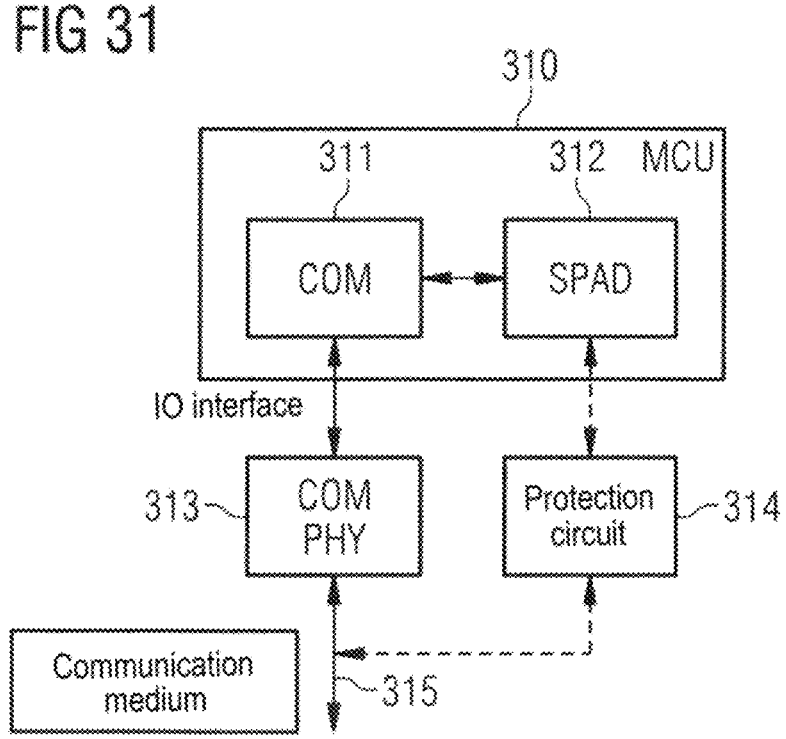

In FIG. 31, a SPAD 312 and an associated communication interface 311 are arranged in a microcontroller 310. Further elements as already described above can be present in the microcontroller, in particular a hardware security module and further communication interfaces and/or further SPADs. The communication interface 311 is connected to a transceiver 313 implementing a physical layer of a communication, for example to a CAN transceiver as described. The transceiver 313 then communicates via a physical medium 315, for example a CAN bus.

In the arrangement of FIG. 31, the SPAD 312 directly obtains signals from a physical medium 315 via an interposed protection circuit 314, for example in order to recover the security code. The protection circuit 314 can comprise standard protection elements such as protection elements against electrostatic discharges (ESD protection elements), overcurrent protection elements or overvoltage protection elements. The exemplary embodiment of FIG. 31 can use a conventional transceiver, but uses an additional protection circuit 314.

Figure 32:
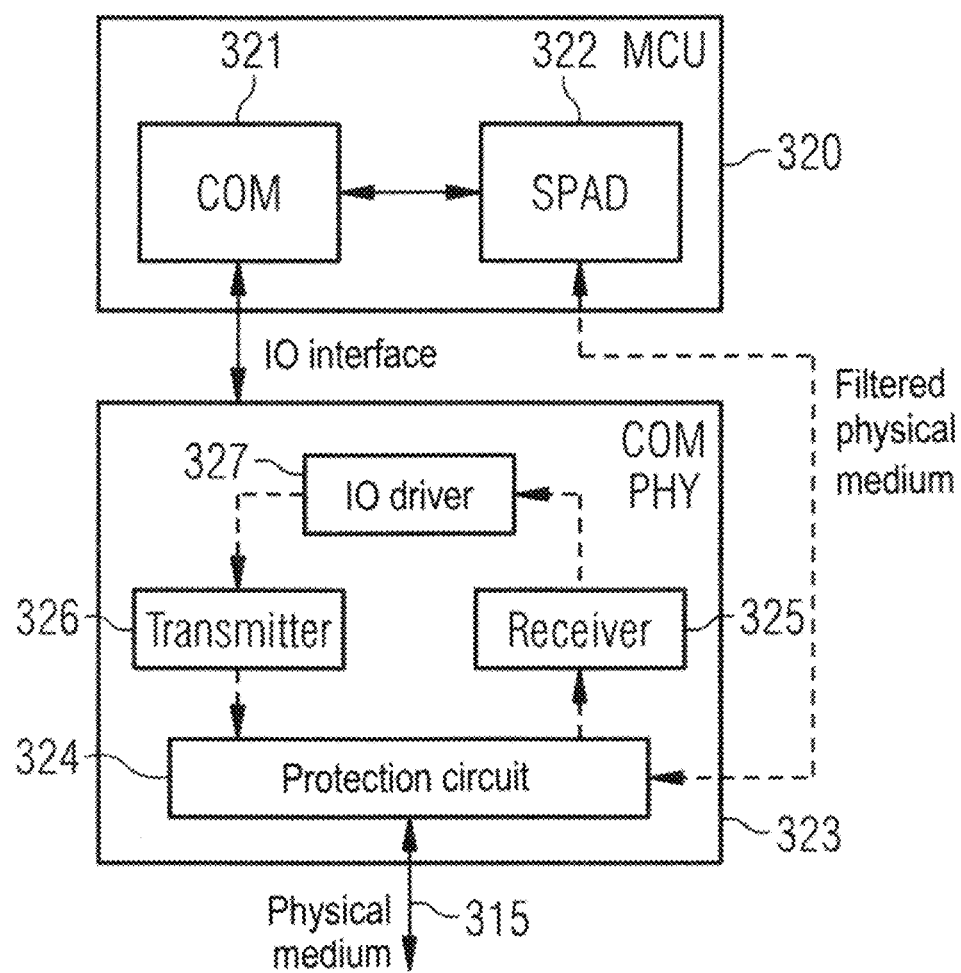

Another arrangement is shown in FIG. 32. In this case, a communication interface 321 and a SPAD 322 are in turn arranged in a microcontroller 320. The communication interface 321 communicates with a transceiver 323, which is depicted in a little more detail in the case of FIG. 32 with a driver circuit 327, a transmitter 326, a receiver 325 and a protection circuit 324. In contrast to FIG. 31, the SPAD in this case uses the protection circuit 324 of the transceiver 323 as well, i.e. it obtains filtered signals from the protection circuit 324. The exemplary embodiment of FIG. 32 does not use an additional protection circuit, but use an appropriately configured transceiver 323 that passes the signal from the protection circuit 324 directly to the SPAD.

Figure 33:
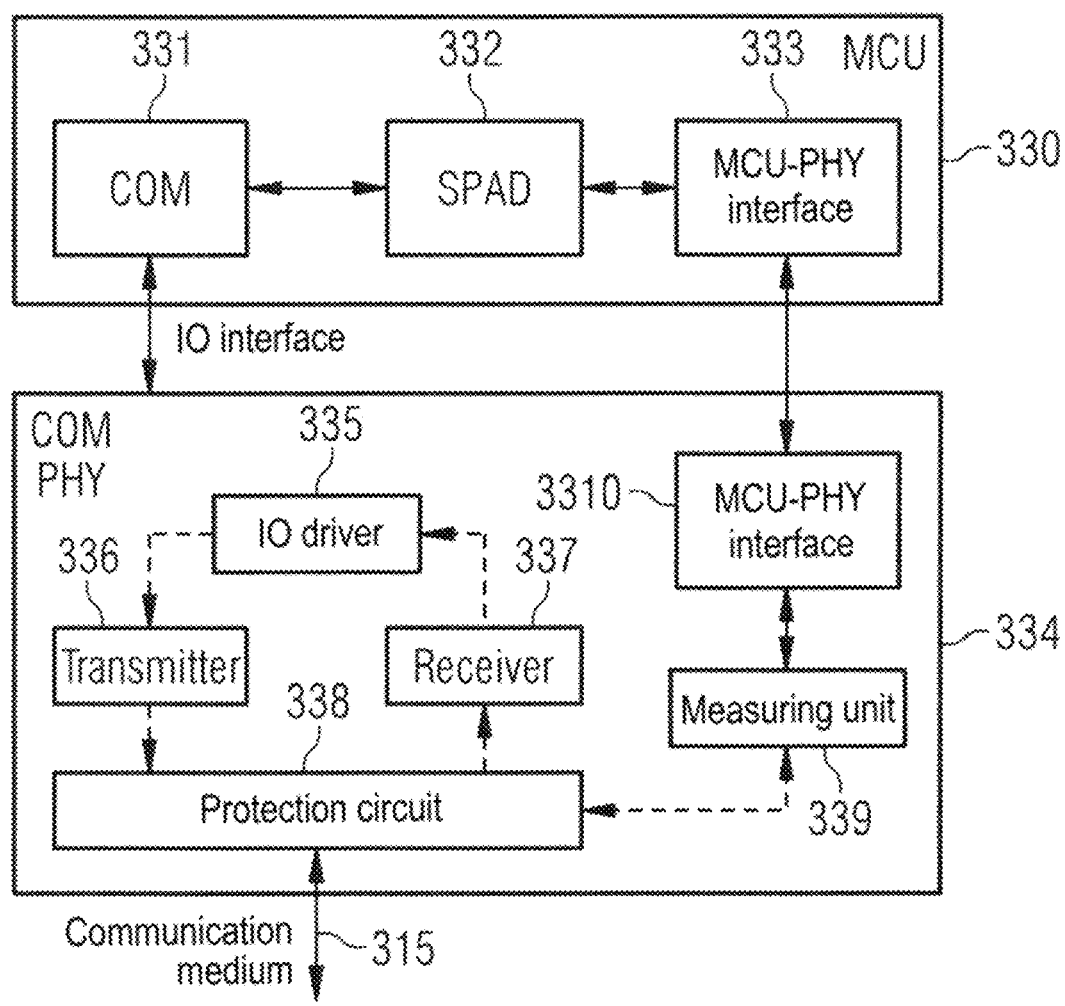

A further arrangement is depicted in FIG. 33. A microcontroller 330 contains a communication interface 331 and a SPAD 332. The communication interface 331 is connected to a transceiver 334 that, like the transceiver of FIG. 32, contains a driver circuit 335, a transmitter 336, a receiver 337 and a protection circuit 338. The protection circuit 338 supplies signals to a measuring circuit 339 that for example can recover the security code and sends the recovered security code via an interface 3310 to an appropriate interface 333 in the microcontroller 330 and from there to the SPAD 332. In this case, the recovery is thus effected—as also shown in FIG. 4, for example—in the transceiver.

The exemplary embodiment of FIG. 33 uses a more complex transceiver 334 with the measuring circuit 339, but on the other hand allows for more precise measurements.

Figure 34:
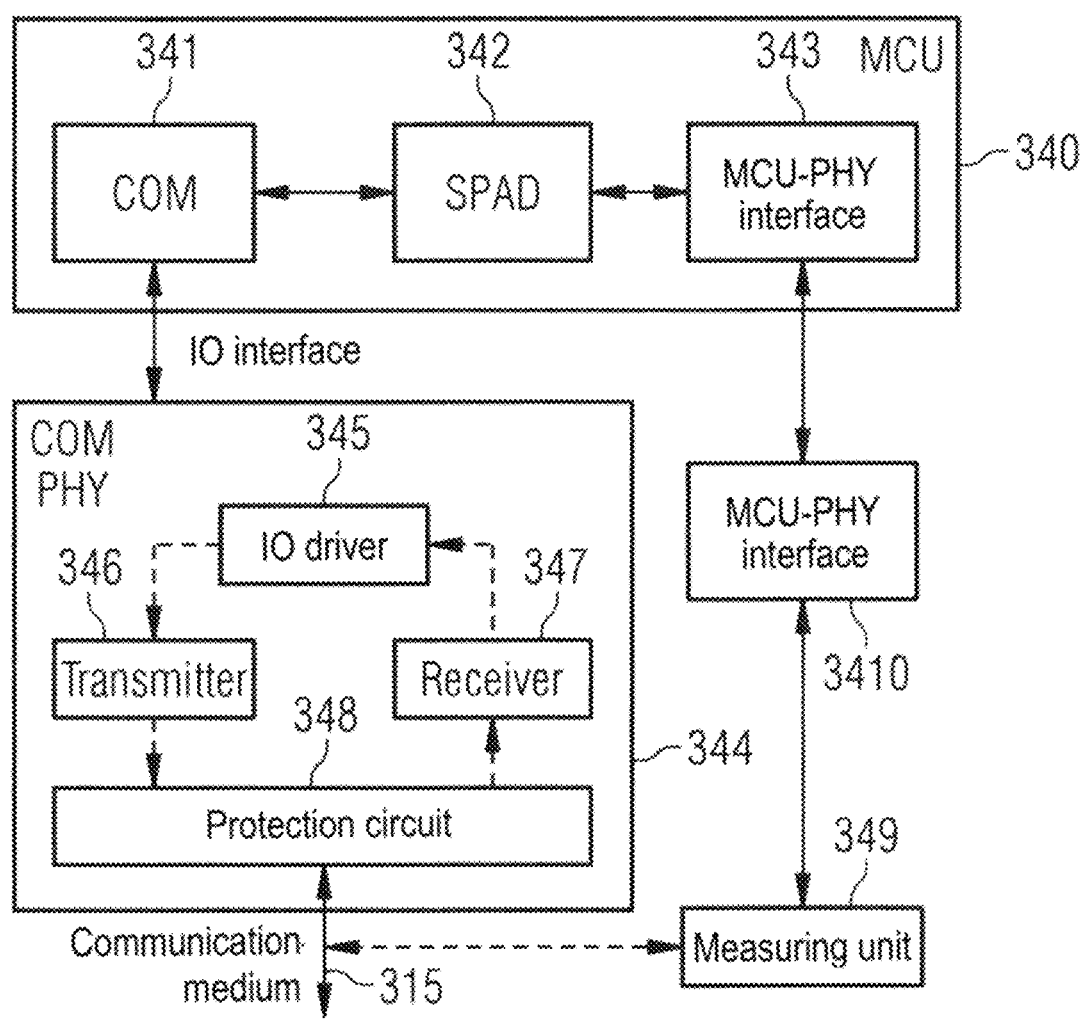

In another exemplary embodiment, which is shown in FIG. 34, a measuring unit 349 corresponding to the measuring unit 339 can be arranged outside the transceiver 344 and outside a microcontroller 340 together with an interface 3410, for example in a separate chip, in order to perform measurements directly on the medium 315. The transceiver 344 contains a driver circuit 345, a transmitter 346, a receiver 347 and a protection circuit 348. The microcontroller 340 contains a SPAD 342, a communication interface 341 and an interface 343. In this case, an additional unit with the measuring unit 349 and the interface 3410 is then also necessary, which possibly needs a separate protection circuit. Otherwise, the operation is as for the exemplary embodiment of FIG. 33.

FIG. 31-34 thus show that different splits and implementations of the functionalities discussed are possible.

Figure 35:
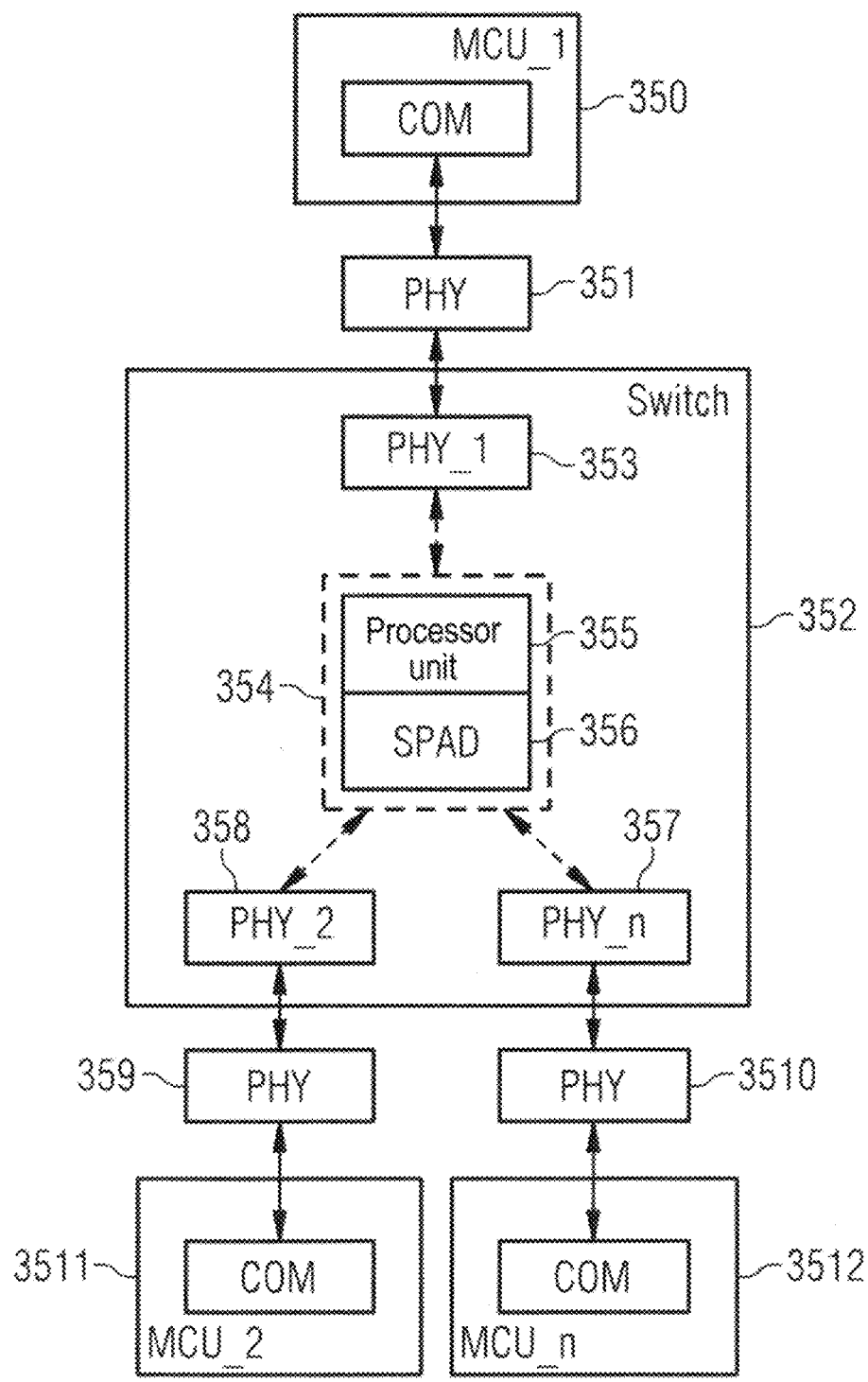

The functionalities of a SPAD can also be provided centrally in a switched network. FIG. 35 shows such a network with a switch 352, which selectively connects various communication subscribers to one another, in the example of FIG. 35 a first microcontroller 350 with a first transceiver 351, a second microcontroller 3511 with a second transceiver 359 and a third microcontroller 3512 with a third transceiver 3510. For this purpose, the switch 352 has transceivers 353, 358 and 357 in order to communicate with the transceivers 351, 359 and 3510, as depicted. In addition, the switch 352 has a processor unit 355 with a SPAD 356, by means of which the signals sent by the microcontrollers 350, 3511, 3512 via the respective transceivers 351, 359, 3510 need to be authenticated. In this case, it is thus not necessary for every microcontroller to have a SPAD, but rather the authentication (check on the modulated cryptographic datum and/or on an additional encryption on the logic protocol layer) can be checked centrally in the switch.

Even in the case of a transceiver that serves multiple channels, for example multiple channels on one or more CAN buses, the provision and checking of a security code can be effected for all the channels in one unit. An example is depicted schematically in FIG. 36.

Figure 36:
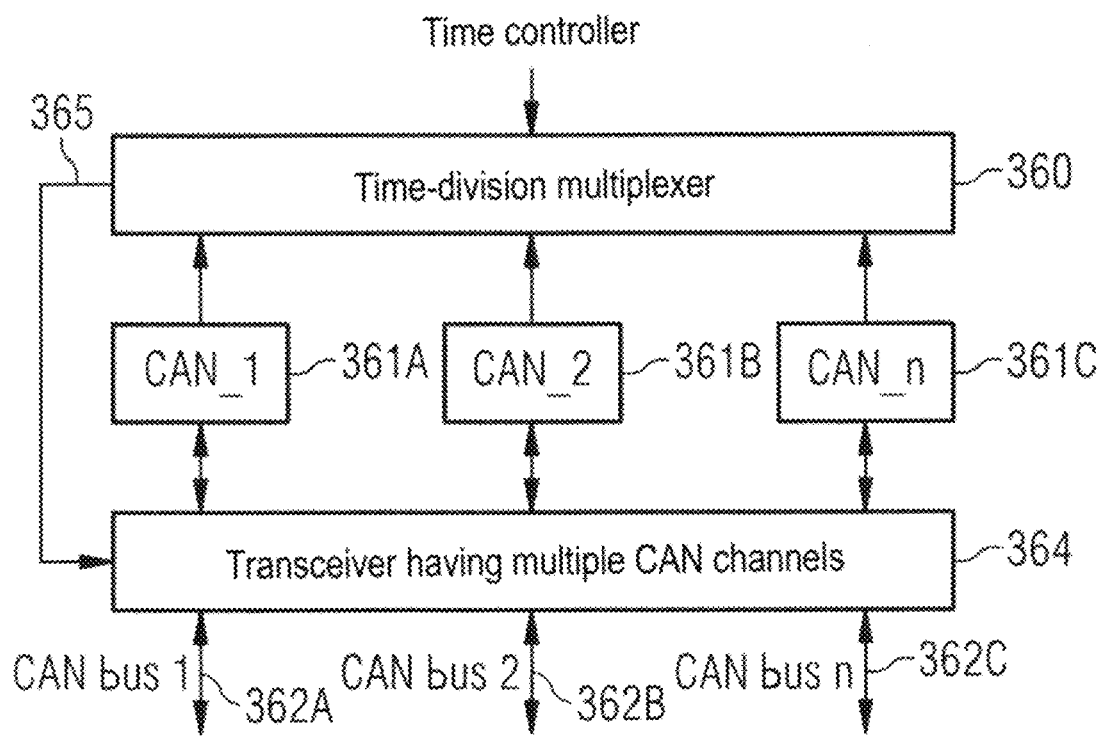

In the exemplary embodiment of FIG. 36, transmit/receive nodes 361A, 361B, 361C provide a transmit signal TX for a respective associated CAN bus 362A, 362B or 362C and receive a corresponding received signal RX. In this regard, the function of the CAN nodes 361A, 361B, 361C corresponds to the elements 33, 34, 39 and 38 of FIG. 3.

The providing of a security code is performed in a time-division multiplexed manner on the basis of time control by a time-division multiplexer that, as indicated by an arrow 356, provides the security code for a multichannel transceiver 364 and controls which CAN bus 362A, 362B, 362C is operated in each case. The nodes 361A, 361B, 361D, as is likewise described with reference to FIG. 3, deliver data and the bit positions to the time-division multiplexer 360 in this case, so that the latter can produce a suitable security code for modulating onto dominant bits of the respective CAN bus. The transceiver 364 then modulates the security code onto the signals on the respective CAN bus fundamentally as already described, with the difference that it is done alternately for the CAN buses using a time-division multiplexing method. In this manner, some exemplary embodiments can result in an implementation for multiple CAN buses being realized with comparatively few components.

As is therefore evident from the figures described above, there are a large number of different options for implementing the techniques described. Therefore, the application of the techniques described is not restricted to one specific type of implementation.

The examples below define at least some of the exemplary embodiments.

Example 1. A transceiver having:
a transmitter designed
to provide at an output a first signal according to a physical communication protocol, and
to provide at the output a second signal comprising at least one cryptographic datum, wherein the first and the second signal are overlaid on one another as an overlay signal at the output, and wherein the overlay signal complies with the physical communication protocol.

Example 2. The transceiver according to example 1, wherein the second signal is a pulsed signal or an AC signal.

Example 3. The transceiver according to either of examples 1 and 2,
wherein the second signal is overlaid on the first signal only at one of at least two levels of the first signal according to the physical communication protocol.

Example 4. The transceiver according to one of examples 1 to 3,
wherein the second signal is overlaid if no level change in the first signal has been effected for a particular time or no level change in the first signal will be effected for a particular time.

Example 5. The transceiver according to one of examples 1 to 4, wherein a logic protocol layer superordinate to the physical communication protocol provides a logic signal, and the logic signal is used to generate the first signal.

Example 6. The transceiver according to example 5, wherein the logic protocol layer is designed to encrypt data to be sent in order to provide the logic signal.

Example 7. The transceiver according to one of the preceding examples, wherein the cryptographic datum is a security code of the transceiver.

Example 8. The transceiver according to one of the preceding examples, wherein the transceiver is provided with a key for generating the cryptographic datum.

Example 9. The transceiver according to example 8, wherein the key is provided by a key authority superordinate to the transceiver.

Example 10. The transceiver according to one of the preceding examples, wherein the transmitter comprises a driver circuit that is set up to provide the overlay signal, and wherein the transmitter is set up to calibrate the driver circuit.

Example 11. The transceiver according to example 10, wherein the driver circuit comprises a first series connection comprising a first switch and a first resistor, which first series connection is coupled between a supply voltage and the output, wherein the first switch is actuatable on the basis of the first signal, and the driver circuit has a second series connection comprising a second switch and a second resistor, which second series connection is coupled between the supply voltage and the output, wherein the second switch is actuatable on the basis of the cryptographic datum.

Example 12. A transceiver having:
a receiver designed
to receive a receive signal, which is an overlay of a first signal according to a physical communication protocol with a second signal comprising a cryptographic datum,
to process the receive signal according to the physical communication protocol in order to obtain information transmitted in the first signal, and
to obtain the cryptographic datum from the receive signal.

Example 13. The transceiver according to example 12, wherein the second signal is a pulsed signal or an AC signal.

Example 14. The transceiver according to one of examples 12 and 13,
wherein the receiver is designed to obtain the cryptographic datum from the overlay of the second signal over the first signal only at one of at least two levels of the first signal according to the physical communication protocol.

Example 15. The transceiver according to one of examples 1 to 3,
wherein the receiver is designed to obtain the cryptographic datum from the overlay of the second signal over the first signal if no level change in the first signal has been effected for a particular time or no level change in the first signal will be effected for a particular time.

Example 16. The transceiver according to one of examples 12 to 15, wherein the information obtained from the first signal is provided as a logic signal to a logic protocol layer superordinate to the physical communication protocol.

Example 17. The transceiver according to example 16, wherein the logic protocol layer is designed to obtain sent data from the logic signal by decryption.

Example 18. The transceiver according to one of the preceding examples, wherein the cryptographic datum is a security code of a further transceiver from which the receive signal is received, and wherein the transceiver is set up to compare the cryptographic datum with an expected cryptographic datum in order to authenticate the further transceiver.

Example 19. The transceiver according to example 18, wherein the transceiver is provided with a key for generating the expected cryptographic datum.

Example 20. The transceiver according to example 19, wherein the key is provided by a key authority superordinate to the transceiver.

Example 21. The transceiver according to one of examples 12-20, wherein the receiver comprises a receive circuit that is set up to obtain the cryptographic datum, and wherein the receiver is set up to calibrate the receive circuit.

Example 22. The transceiver according to example 21, wherein the calibrating comprises determining a reference voltage for obtaining the cryptographic datum.

Example 23. The transceiver according to example 22, wherein the communication circuit comprises a calibration circuit that is set up to determine the reference voltage on the basis of a supply voltage and/or a temperature.

Example 24. The transceiver according to example 23, wherein the calibration circuit comprises a scaled replica of at least part of a transmit path for sending the receive signal, wherein the calibration circuit is set up to determine the reference voltage on the basis of a voltage drop across part of the replica.

Example 25. The transceiver according to example 24, wherein the part of the replica comprises a resistor replicating a resistor coupled to at least one transmission line via which the receive signal is receivable.

Example 26. The transceiver according to example 24 or 25, wherein the part of the replica is adjustable, wherein the calibration circuit is set up to adjust the part of the replica to match a corresponding part of the transmit path.

Example 27. The transceiver according to example 26, wherein the calibration circuit is set up to adjust the part of the replica on the basis of variations in the at least two signal levels during a calibration phase.

Example 28. The transceiver according to example 26 or 28, wherein the calibration circuit is set up to validate the adjustment of the part of the replica.

Example 29. The transceiver according to one of examples 12-28, wherein the receiver is set up to process only the received signal according to the physical communication protocol in order to obtain information transmitted in the first signal if the received signal contains no second signal and/or the cryptographic datum is not obtainable from the received signal.

Example 30. A system, comprising:
a first transceiver according to one of examples 1-11, and
a second transceiver according to one of examples 12-29, which is coupled to the first transceiver via a communication medium.

Example 31. The system according to example 30, wherein the first transceiver and/or the second transceiver is part of a control unit of a vehicle.

Example 32. A signal, comprising an overlay of:
a first signal according to a physical communication protocol, and
a second signal comprising at least one cryptographic datum,
wherein the signal complies with the physical communication protocol.

Example 33. The signal according to example 32, wherein the second signal is a pulsed signal or an AC signal.

Example 34. The signal according to either of examples 32 and 33,
wherein the second signal is overlaid on the first signal only at one of at least two levels of the first signal according to the physical communication protocol.

Example 35. The signal according to either of examples 32 and 33,
wherein the second signal is overlaid on the first signal if no level change in the first signal has been effected for a particular time or no level change in the first signal will be effected for a particular time.

Example 36. The signal according to one of examples 32 to 35, wherein the first signal comprises logically encrypted data.

Although specific exemplary embodiments have been illustrated and described in this description, persons with standard knowledge in the art will recognize that a large number of alternative and/or equivalent implementations can be chosen as a replacement for the specific exemplary embodiments shown and described in this description without departing from the scope of the embodiments shown. It is the intention for this application to cover all adaptations or variations of the specific exemplary embodiments discussed here.

The invention claimed is:
1. A transceiver, comprising:
a transmitter configured to output a first signal according to a physical communication protocol, and to output a second signal that is a digital signal including at least one cryptographic datum that digitally represents a security code of the transceiver, the physical communication protocol defining a voltage range including an upper voltage threshold and a lower voltage threshold associated with a logic high voltage level,
wherein the first signal and the second signal are overlaid onto one another to generate an overlay signal at an output of the transmitter, and
wherein, as a result of the second signal being overlaid onto the first signal, the overlay signal has (i) as a result of a portion of the second signal having a logic high value, a first voltage level that is greater than the lower voltage threshold and less than the upper voltage threshold, and (ii) as a result of a portion of the second signal having a logic low value, a second voltage level that is greater than the lower voltage threshold and less than the first voltage level, such that the overlay signal complies with the physical communication protocol.

2. The transceiver as claimed in claim 1, wherein the second signal is a pulsed signal.

3. The transceiver as claimed in claim 1, wherein the second signal is overlaid onto the first signal only at one of at least two levels of the first signal according to the physical communication protocol.

4. The transceiver as claimed in claim 1, wherein the second signal is overlaid if no level change in the first signal has been effected for a threshold time period, or if no level change in the first signal will be effected for a threshold time period.

5. The transceiver as claimed in claim 1, wherein a logic protocol layer superordinate to the physical communication protocol provides a logic signal, and wherein the transmitter is configured to use the logic signal to generate the first signal.

6. The transceiver as claimed in claim 5, wherein the logic protocol layer is designed to encrypt data to be sent in order to provide the logic signal.

7. The transceiver as claimed in claim 1, wherein the transceiver is configured with a key for generating the cryptographic datum.

8. The transceiver as claimed in claim 7, wherein the key is provided by a key authority superordinate to the transceiver.

9. The transceiver as claimed in claim 1, wherein the transmitter comprises a driver circuit that is configured to generate the overlay signal, and
wherein the transmitter is configured to calibrate the driver circuit.

10. The transceiver as claimed in claim 9, wherein:
the driver circuit comprises a first series connection comprising a first switch and a first resistor, the first series connection being coupled between a supply voltage and the output of the transmitter, and the first switch being actuatable based upon the first signal,
the driver circuit has a second series connection comprising a second switch and a second resistor, the second series connection being coupled between the supply voltage and the output, and
the second switch is actuatable based upon the cryptographic datum.

11. A transceiver, comprising:
a receiver configured to:
receive a receive signal that complies with a physical communication protocol, which is an overlay of (i) a first signal according to the physical communication protocol, and (ii) a second signal that is a digital signal comprising a cryptographic datum that digitally represents a security code of a further transceiver from which the receive signal is received, the physical communication protocol defining a voltage range including an upper voltage threshold and a lower voltage threshold associated with a logic high voltage level,
wherein, as a result of the second signal being overlaid onto the first signal, the overlay signal has (i) as a result of a portion of the second signal having a logic high value, a first voltage level that is greater than the lower voltage threshold and less than the upper voltage threshold and (ii) as a result of a portion of the second signal having a logic low value, a second voltage level that is greater than the lower voltage threshold and less than the first voltage level, such that the overlay signal complies with the physical communication protocol;
process the received signal according to the physical communication protocol to obtain information transmitted in the first signal, and
obtain the cryptographic datum from the received signal.

12. The transceiver as claimed in claim 11, wherein the second signal is a pulsed signal.

13. The transceiver as claimed in claim 11, wherein the receiver is configured to obtain the cryptographic datum from the receive signal only at one of at least two levels of the first signal according to the physical communication protocol.

14. The transceiver as claimed in claim 11, wherein the receiver is configured to obtain the cryptographic datum from the receive signal if no level change in the first signal has been effected for a threshold period of time, or if no level change in the first signal will be effected for a threshold period of time.

15. The transceiver as claimed in claim 11, wherein the information obtained from the first signal is provided as a logic signal to a logic protocol layer superordinate to the physical communication protocol.

16. The transceiver as claimed in claim 15, wherein the logic protocol layer is configured to obtain data from the logic signal by decryption.

17. The transceiver as claimed in claim 11, wherein the transceiver is configured to compare the cryptographic datum with an expected cryptographic datum to authenticate the further transceiver.

18. The transceiver as claimed in claim 17, wherein the transceiver is configured with a key for generating the expected cryptographic datum.

19. The transceiver as claimed in claim 18, wherein the key is provided by a key authority superordinate to the transceiver.

20. The transceiver as claimed in claim 11, wherein the receiver comprises a receive circuit that is configured to obtain the cryptographic datum, and wherein the receiver is configured to calibrate the receive circuit.

21. The transceiver as claimed in claim 20, wherein the calibrating comprises determining a reference voltage for obtaining the cryptographic datum.

22. The transceiver as claimed in claim 11, wherein the receiver is configured to process only the received signal according to the physical communication protocol to obtain information transmitted in the first signal if the received signal contains no second signal or if the cryptographic datum is not obtainable from the received signal.

23. A transceiver, comprising:
a transmitter configured to:
output a first signal according to a physical communication protocol, and
output a second signal that is a digital signal including at least one cryptographic datum that digitally represents a security code of the transceiver, the physical communication protocol defining a voltage range including an upper voltage threshold and a lower voltage threshold associated with a logic high voltage level,
wherein the first signal and the second signal are overlaid onto one another to generate an overlay signal at an output of the transmitter, and
wherein, as a result of the second signal being overlaid onto the first signal, the overlay signal has (i) as a result of a portion of the second signal having a logic high value, a first voltage level that is greater than the lower voltage threshold and less than the upper voltage threshold, and (ii) as a result of a portion of the second signal having a logic low value, a second voltage level that is greater than the lower voltage threshold and less than the first voltage level, such that the overlay signal complies with the physical communication protocol; and a receiver configured to:
  receive the overlay signal;
  process the overlay signal according to the physical communication protocol to obtain information transmitted in the first signal; and
  obtain the cryptographic datum from the overlay signal, wherein the transmitter and the receiver are coupled to one another via a communication medium.

24. The transceiver as claimed in claim 23, wherein the transmitter and the receiver are part of a control unit associated with a vehicle.

* * * * *